United States Patent
Tsuchida

(10) Patent No.: US 8,320,000 B2
(45) Date of Patent: Nov. 27, 2012

(54) IMAGE FORMING SYSTEM, IMAGE TRANSMITTING APPARATUS, IMAGE DATA PROCESSING METHOD, PROGRAM, AND STORAGE MEDIUM

(75) Inventor: Taro Tsuchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 12/396,802

(22) Filed: Mar. 3, 2009

(65) Prior Publication Data

US 2009/0225358 A1    Sep. 10, 2009

(30) Foreign Application Priority Data

Mar. 10, 2008    (JP) ................. 2008-060078

(51) Int. Cl.
*G06F 3/12*    (2006.01)
*G06F 15/00*    (2006.01)
*G06K 1/00*    (2006.01)
*G06K 15/00*    (2006.01)
*H04N 1/40*    (2006.01)

(52) U.S. Cl. ............ 358/1.15; 358/3.01; 358/3.13; 358/1.1; 358/1.2; 358/1.9

(58) Field of Classification Search .......... None
See application file for complete search history.

(56) References Cited

U.S. PATENT DOCUMENTS

| | | | |
|---|---|---|---|
| 7,268,897 B1 * | 9/2007 | Moro et al. | 358/1.13 |
| 2002/0030839 A1 * | 3/2002 | Kawanabe et al. | 358/1.13 |
| 2002/0032736 A1 * | 3/2002 | Idehara | 709/206 |
| 2002/0140983 A1 * | 10/2002 | Shimizu | 358/3.01 |
| 2003/0016263 A1 * | 1/2003 | Takahashi et al. | 347/19 |
| 2003/0210409 A1 * | 11/2003 | Huang et al. | 358/1.1 |
| 2004/0012812 A1 * | 1/2004 | Shimizu | 358/1.15 |
| 2005/0097171 A1 * | 5/2005 | Hikichi | 709/204 |
| 2006/0092455 A1 * | 5/2006 | Maeda et al. | 358/1.15 |
| 2006/0203260 A1 * | 9/2006 | Aonuma | 358/1.2 |
| 2006/0203280 A1 * | 9/2006 | Kobayashi et al. | 358/1.14 |
| 2006/0215204 A1 * | 9/2006 | Miyamoto et al. | 358/1.13 |
| 2007/0064253 A1 * | 3/2007 | Yang | 358/1.13 |
| 2007/0070389 A1 * | 3/2007 | Hidaka | 358/1.15 |
| 2008/0100856 A1 * | 5/2008 | Lee et al. | 358/1.9 |
| 2008/0219597 A1 * | 9/2008 | Nakamura | 382/306 |
| 2009/0225372 A1 * | 9/2009 | Ikeda | 358/3.13 |

FOREIGN PATENT DOCUMENTS

| | | |
|---|---|---|
| JP | 3-078370 A | 4/1991 |
| JP | 2002-027218 A | 1/2002 |

* cited by examiner

*Primary Examiner* — Satwant Singh

(74) *Attorney, Agent, or Firm* — Fitzpatrick, Cella, Harper & Scinto

(57) ABSTRACT

An image forming system includes an image transmitting apparatus which transmits generated image data to a designated transmission destination, and an image receiving apparatus which executes processing for the received image data. The image transmitting apparatus includes a designation unit which accepts designation of an image receiving apparatus serving as a transmission destination, and designation of a transmission mode which specifies the contents of processing in the image receiving apparatus, an acquisition unit which acquires transmission destination information representing the operating state of the image receiving apparatus by communication with the image receiving apparatus, a generation unit which generates image data to be processed in the image receiving apparatus on the basis of the designated transmission mode and acquired transmission destination information, and a transmitting unit which transmits the transmission mode and image data to the image receiving apparatus.

12 Claims, 18 Drawing Sheets

FIG. 11

REMOTE COPY TABLE

| APPARATUS ID | CALIBRATION EXECUTION TIME | CALIBRATION END TIME | LUT | IMAGE FORMING PATTERN | NUMBER OF SHEETS PRINTABLE TILL START OF CALIBRATION | OPERATION EXECUTED WHEN NUMBER OF PRINTED SHEETS REACHES CALIBRATION START COUNT |
|---|---|---|---|---|---|---|
| 0023 | T1 | T2 | {12,34,56,78,....} | IMAGE FORMING PATTERN 1 | 208 | EXECUTE CALIBRATION |
| 0813 | T3 | T4 | {01,23,25,73,....} | IMAGE FORMING PATTERN 2 | 12 | CONTINUE PRINTING |
| 1324 | 0 | 0 | {00,00,00,00,....} | NULL | 0 | UNDEFINED |

FIG. 12

REMOTE COPY TABLE

| APPARATUS ID | CALIBRATION EXECUTION TIME | CALIBRATION END TIME | LUT | IMAGE FORMING PATTERN | NUMBER OF SHEETS PRINTABLE TILL START OF CALIBRATION | OPERATION EXECUTED WHEN NUMBER OF PRINTED SHEETS REACHES CALIBRATION START COUNT |
|---|---|---|---|---|---|---|
| 0813 | T5 | T6 | {03,26,21,70,....} | IMAGE FORMING PATTERN 2 | 500 | CONTINUE PRINTING |
| 0023 | T1 | T2 | {12,34,56,78,....} | IMAGE FORMING PATTERN 1 | 208 | EXECUTE CALIBRATION |
| 1324 | 0 | 0 | {00,00,00,00,....} | NULL | 0 | UNDEFINED |

IMAGE FORMING SYSTEM, IMAGE TRANSMITTING APPARATUS, IMAGE DATA PROCESSING METHOD, PROGRAM, AND STORAGE MEDIUM

BACKGROUND OF THE INVENTION

1. Field of the Invention

The present invention relates to an image forming system, image transmitting apparatus, image data processing method, program, and storage medium.

2. Description of the Related Art

In recent offices, SOHO (Small Office/Home Office) environments, and the like, an MFP (Multi-Functional Peripheral) formed from a copying machine, printer, and scanner, and an SFP (Single-Functional Peripheral) are connected to networks and used.

There are "remote copy" and "BOX delivery" functions of transferring image data between the MFP and the SFP, printing it on a print medium such as paper, and accumulating it in an apparatus. When executing the "remote copy" and "BOX delivery" functions, image data, which is multi-valued luminance data, is transmitted to maintain the reproducibility of tint, particularly for a color image. This is because the luminance density conversion characteristic changes over time, and in actual printing, luminance density conversion processing needs to be done in accordance with the state of the image processing unit.

More specifically, R, G, and B luminance data are converted into C, M, Y, and K (or Bk) density data in accordance with an LUT (Look Up Table) corresponding to the state of the image processing unit. The LUT is updated by executing calibration for correcting a change over time, so the reusability of multi-valued luminance data is high. A dither pattern designed uniquely to the image processing unit is applied to density data to convert the density data into half-tone data. Then, print processing is done.

In terms of the data size, half-tone data is higher in compression efficiency than multi-valued luminance data and multi-valued density data, and can decrease the data size. Thus, half-tone data can have higher response speed in image transfer.

From this, the purpose of use of image data determines which of multi-valued image data having high reusability and half-tone data having high response speed in image transfer is used to transfer an image.

To communicate multi-valued image data and half-tone image data, some facsimile image data transfer techniques have been proposed.

For example, there is proposed a technique when changing the density of image data again after converting image data into half-tone data and transmitting the half-tone data (Japanese Patent Laid-Open No. 3-78370). Japanese Patent Laid-Open No. 3-78370 discloses a method of holding a multi-valued image on the transmitting side, and transmitting half-tone image data having undergone density conversion again in response to a retransmission request from the receiving side.

Japanese Patent Laid-Open No. 2002-27218 proposes a method of determining which of a half-tone image and multi-valued image can be received by the receiving side, and switching an image to be transmitted and transmitting the image, as needed.

As described above, the image data size increases when multi-valued image data is transmitted in "remote copy". Transfer of image data takes a long time, decreasing the copy speed. In other words, even if remote copy is executed, the transfer destination cannot quickly acquire print data, resulting in a poor-usability system.

If image data processed at a specific half-toning parameter is transmitted to decrease the image data size, poor-reusability image data is transmitted to the receiving side.

Japanese Patent Laid-Open No. 3-78370 proposes a method of holding multi-valued image data on the transmitting side, and transmitting half-tone image data having undergone image processing at a different half-toning parameter in response to a retransmission request from the receiving side.

However, according to Japanese Patent Laid-Open No. 3-78370, the transmitting side needs to hold a multi-valued image as long as it may receive a retransmission request. For image data, the timing of reuse of which is not known, like BOX delivery, the transmitting side needs to hold a multi-valued image for a long time.

Japanese Patent Laid-Open No. 2002-27218 proposes a method of determining which of a half-tone image and multi-valued image can be received by the receiving side, and switching image data to be transmitted.

However, according to Japanese Patent Laid-Open No. 2002-27218, only the image data transmission method is switched in accordance with the ability of the receiving side, and no image data is switched in consideration of the purpose of use of image data.

SUMMARY OF THE INVENTION

The present invention has been made to overcome the conventional drawbacks, and has as its object to provide a technique capable of switching transmission between multi-valued image data and half-tone image data in accordance with the purpose of use of image data.

It is another object of the present invention to provide a technique capable of achieving both usability and image data reusability by, when half-tone image data is transmitted, transmitting multi-valued image data later, as needed.

It is still another object of the present invention to provide a technique capable of efficiently transmitting and receiving image data by efficiently communicating not only image data but also a half-toning parameter.

According to one aspect of the present invention, there is provided an image forming system comprising an image transmitting apparatus which transmits generated image data to a designated transmission destination, and an image receiving apparatus which executes processing for the received image data, the image transmitting apparatus comprising: a designation unit adapted to accept designation of an image receiving apparatus serving as a transmission destination, and designation of a transmission mode which specifies a content of processing in the image receiving apparatus; a generation unit adapted to generate image data to be processed in the image receiving apparatus in accordance with the designation of the transmission mode accepted by the designation unit; and a transmitting unit adapted to transmit the designation of the transmission mode and the image data to the image receiving apparatus, and the image receiving apparatus comprising: a receiving unit adapted to receive the designation of the transmission mode and the image data which are transmitted from the transmitting unit; a determination unit adapted to determine, based on the designation of the transmission mode received by the receiving unit, whether to perform print processing for the image data or store the image data in a storage unit for reuse; and a processing unit adapted to process the image data on the basis of a determination result of the determination unit.

According to another aspect of the present invention, there is provided an image data processing method in an image forming system having an image transmitting apparatus which transmits generated image data to a designated transmission destination, and an image receiving apparatus which executes processing for the received image data, a method executed in the image transmitting apparatus, comprising: a designation step of accepting designation of an image receiving apparatus serving as a transmission destination, and designation of a transmission mode which specifies a content of processing in the image receiving apparatus; a generation step of generating image data to be processed in the image receiving apparatus in accordance with the designation of the transmission mode accepted in the designation step; and a transmitting step of transmitting the designation of the transmission mode and the image data to the image receiving apparatus, and a method executed in the image receiving apparatus, comprising: a receiving step of receiving the designation of the transmission mode and the image data which are transmitted in the transmitting step; a determination step of determining, based on the designation of the transmission mode received in the receiving step, whether to perform print processing for the image data or store the image data in a storage unit for reuse; and a processing step of processing the image data on the basis of a determination result of the determination step.

According to still another aspect of the present invention, there is provided an image transmitting apparatus which transmits image data to an image receiving apparatus, the image transmitting apparatus comprising: a half-tone image data transmitting unit adapted to transmit half-tone image data as the image data to the image receiving apparatus; and a multi-valued image data transmitting unit adapted to transmit multi-valued image data corresponding to the half-tone image data to the image receiving apparatus after transmitting the half-tone image data.

The present invention can switch transmission between multi-valued image data and half-tone image data in accordance with the purpose of use of image data.

The present invention can achieve both usability and image data reusability by, when half-tone image data is transmitted, transmitting multi-valued image data later, as needed.

The present invention can efficiently transmit and receive image data by efficiently communicating a half-toning parameter.

Further features of the present invention will become apparent from the following description of exemplary embodiments with reference to the attached drawings.

BRIEF DESCRIPTION OF THE DRAWINGS

FIG. 11 is a table exemplifying the contents of a remote copy table before update;

FIG. 12 is a table exemplifying the contents of the remote copy table after update;

DESCRIPTION OF THE EMBODIMENTS

A preferred embodiment of the present invention will be exemplified in detail below with reference to the accompanying drawings. Components set forth in the embodiment are merely examples, and the technical scope of the present invention should be determined by the scope of the appended claims and is not limited to the individual embodiment to be described below.

First Embodiment

<Overall Configuration of Image Forming System>

Figure 1:
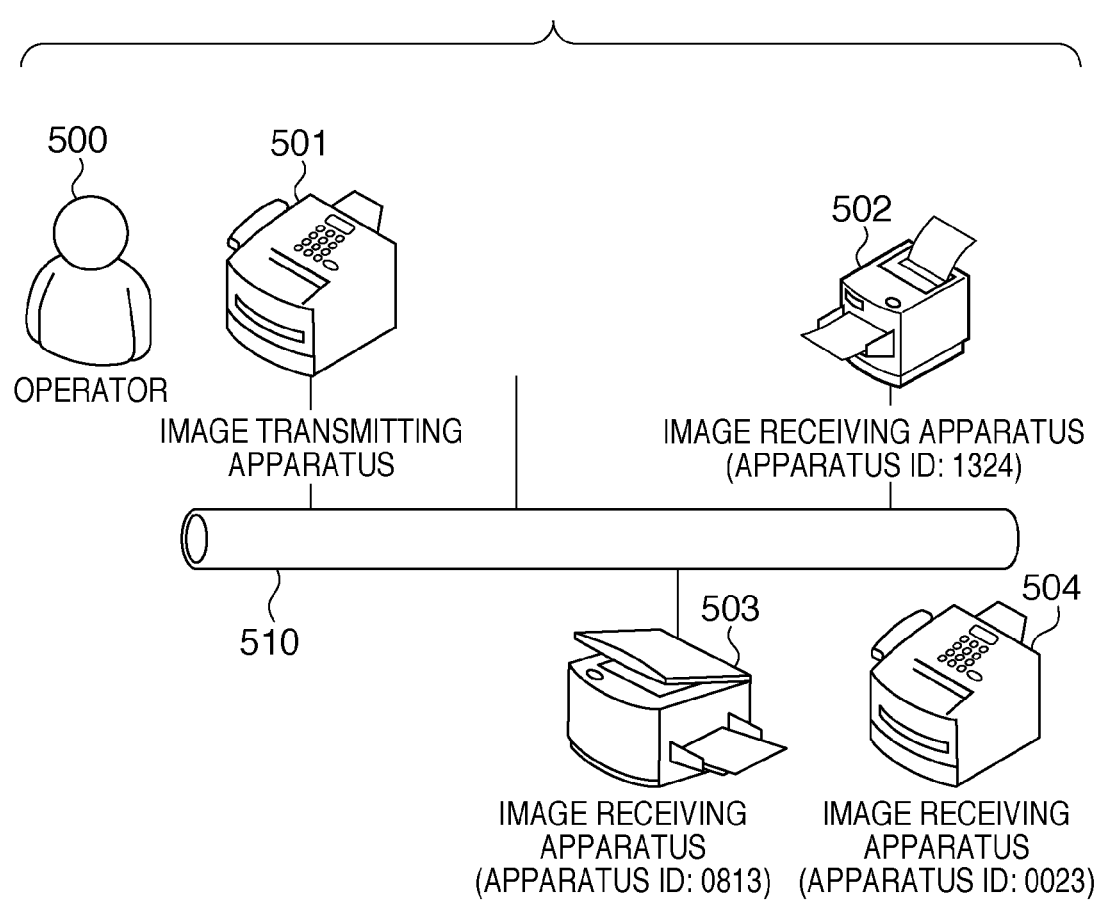
FIG. 1 is a schematic view showing the overall configuration of an image forming system according to an embodiment of the present invention.

FIG. 1 is a schematic view showing the overall configuration of an image forming system proposed by the present invention. An operator 500 reads a document using an image transmitting apparatus 501, and transmits the image data via a network 510. For example, "remote copy" is executed to transmit image data from the image transmitting apparatus 501 to an image receiving apparatus 503 and print it by the image receiving apparatus 503.

Also, "BOX delivery" is executed to transmit image data from the image transmitting apparatus 501 to the BOX of an image receiving apparatus 504.

<Structure of Image Forming Apparatus>

Figure 2:
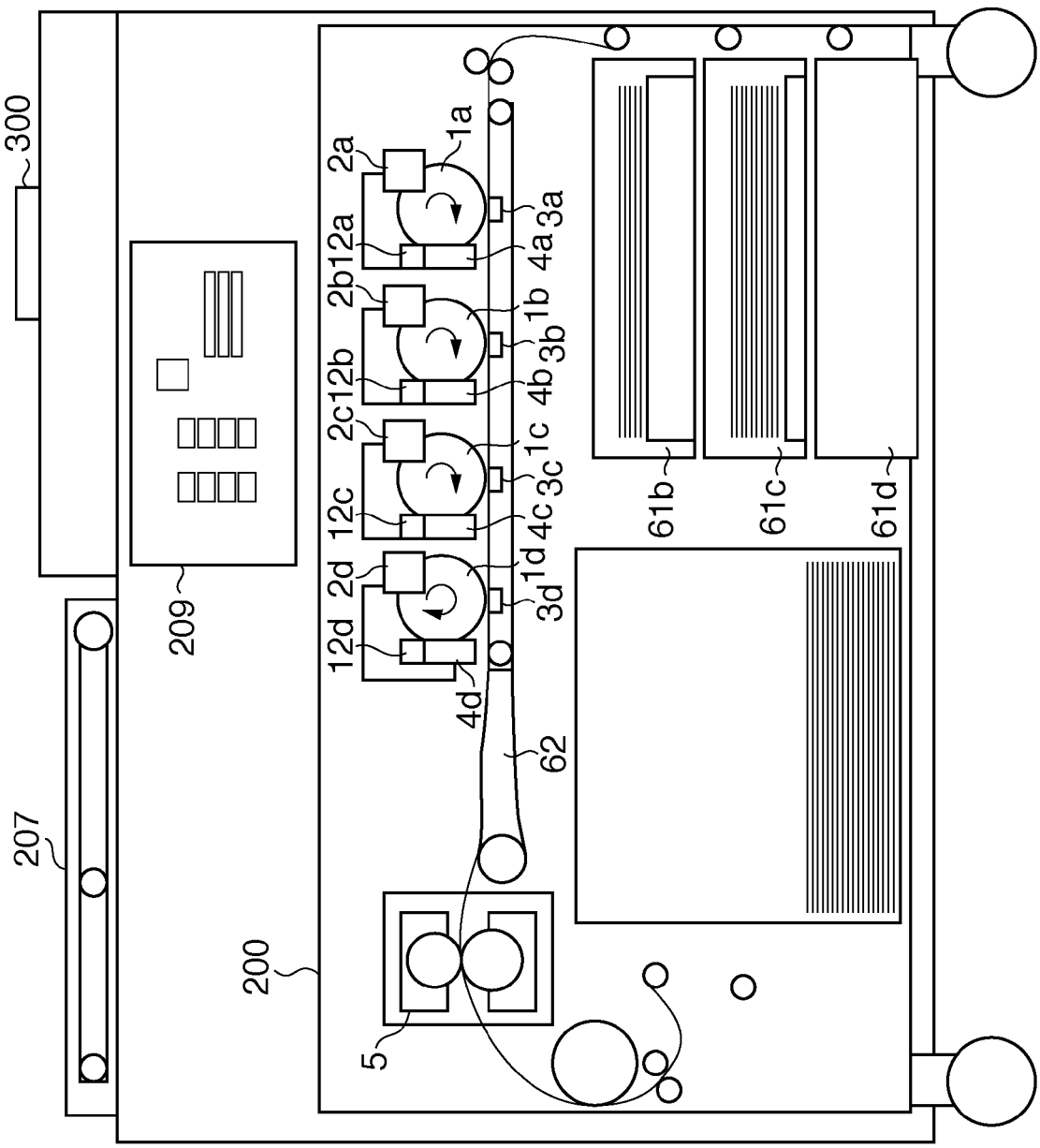
FIG. 2 is a sectional view showing the schematic structure of an image forming apparatus according to the embodiment of the present invention.

FIG. 2 is a sectional view showing the schematic structure of a full four-color laser beam printer (to be referred to as a "printer" hereinafter) serving as an image forming apparatus according to the embodiment which can function as the image transmitting apparatus 501 or the image receiving apparatus 503 or 504.

The printer shown in FIG. 2 includes a document reading unit 207 which reads a document image, an image processing unit 209 which performs image processing such as tone correction for a read image signal, and a printer unit 200 which forms a visible image on a print sheet P based on an image signal.

The printer unit 200 includes four image forming stations which form magenta (M), cyan (C), yellow (Y), and black (BK) images, respectively.

The respective image forming stations include electrophotographic photoconductive bodies (to be referred to as "photoconductive drums" hereinafter) 1a, 1b, 1c, and 1d serving as image carriers supported rotatably in directions indicated by respective arrows.

Chargers 12a, 12b, 12c, and 12d, developing units 2a, 2b, 2c, and 2d, cleaners 4a, 4b, 4c, and 4d, and the like are arranged along the rotational directions of the photoconductive drums 1a, 1b, 1c, and 1d. A transfer belt 31 is arranged below the photoconductive drums 1a, 1b, 1c, and 1d between the developing units 2a, 2b, 2c, and 2d and the cleaners 4a, 4b, 4c, and 4d so as to contact the photoconductive drums 1a, 1b, 1c, and 1d. The transfer belt 31 sequentially conveys the print sheet P serving as a print medium to the photoconductive drums 1a, 1b, 1c, and 1d. In the respective image forming stations, images formed on the photoconductive drums 1a, 1b, 1c, and 1d are transferred onto the print sheet P on the transfer belt 31 by transfer chargers 3a, 3b, 3c, and 3d.

The printer unit 200 includes a plurality of paper feed units, that is, paper feed trays 61b, 61c, and 61d capable of loading print sheets P. While the print sheet P is supported on the transfer belt 31 and passes through the respective image forming stations, toner images of respective colors formed on the photoconductive drums 1a, 1b, 1c, and 1d are sequentially transferred onto the print sheet P. After the end of the transfer process, the print sheet P is separated from the transfer belt 31, and conveyed to a fixing unit 5 by a conveyance belt 62 serving as a print paper guide unit.

The document reading unit (to be referred to as a "reader unit" hereinafter) 207 optically scans a document set on the document table, and reads it by a CCD (not shown), acquiring image signals of respective colors.

The image processing unit 209 performs image processing such as tone correction, which is a feature of the embodiment, for image signals of respective colors read by the reader unit 207. Details of processing in the image processing unit 209 will be described later.

An operation display 300 of the laser beam printer receives command inputs from the operator, and notifies him of the apparatus state.

<Processing Block>

Figure 3:
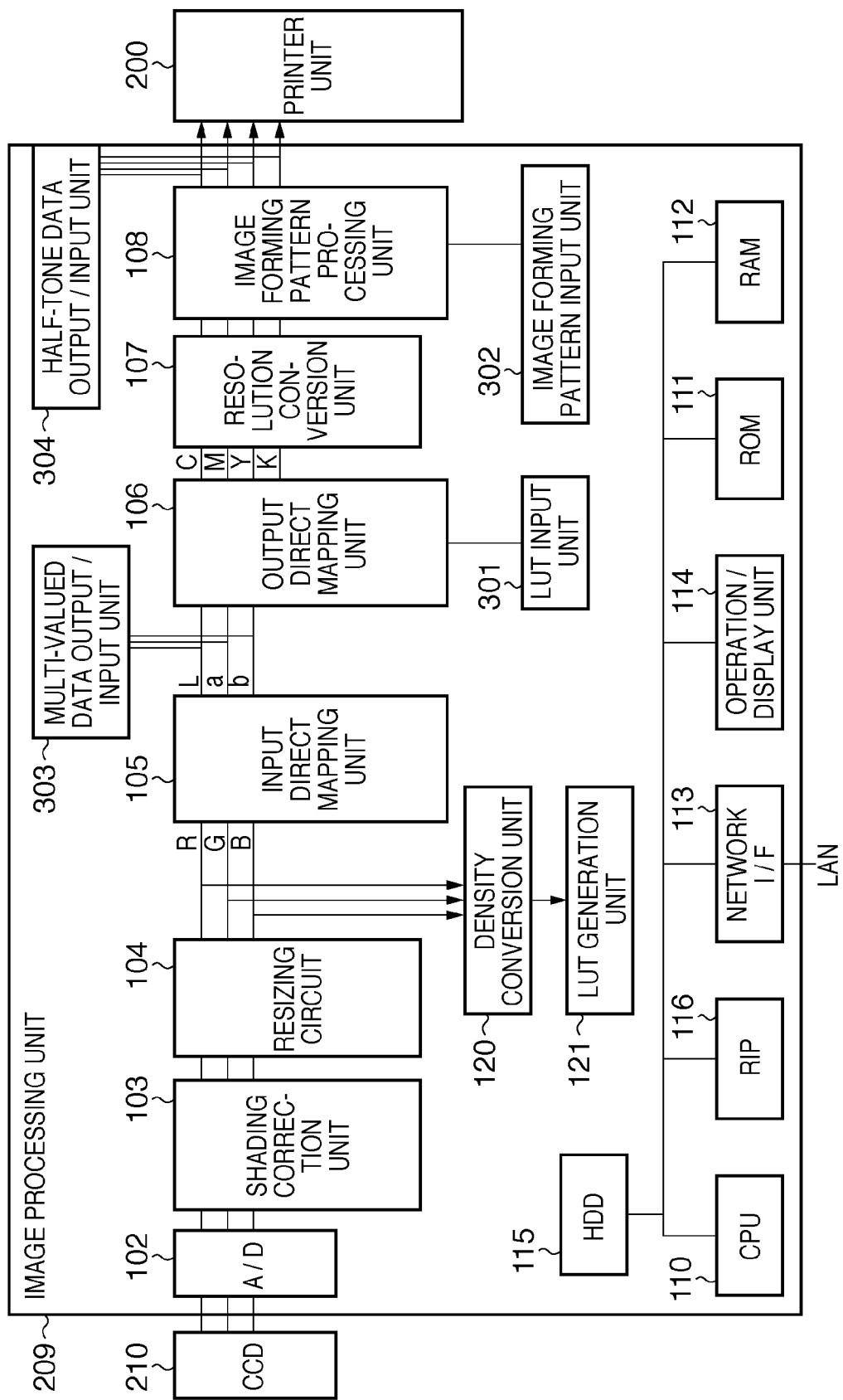
FIG. 3 is a block diagram showing the schematic arrangement of an image processing unit 209.

FIG. 3 is a block diagram showing the schematic arrangement of the image processing unit 209 in each of the image transmitting apparatus and image receiving apparatus according to the embodiment of the present invention. In FIG. 3, a CCD 210 reads a document image at 600 dpi, and inputs the read image as R, G, and B signals to the image processing unit 209. An A/D converter 102 converts the R, G, and B signals input to the image processing unit into digital R, G, and B signals.

A shading correction unit 103 corrects the illumination light quantity, light quantity nonuniformity generated in the lens optical system, and sensitivity nonuniformity of the pixels of the CCD 210. A resizing circuit 104 enlarges/reduces a read image. An input direct mapping unit 105 converts input R, G, and B signals into signals in the device-independent L*a*b* color space. An output direct mapping unit 106 converts L*, a*, and b* signals into specific C, M, Y, and K signals by looking up a table input from an LUT input unit 301.

A resolution conversion unit 107 converts a 600-dpi image signal into a 1,200-dpi image signal, and can ON/OFF-control resolution conversion under the control of a CPU 110. An image forming pattern processing unit 108 has a multi-valued conversion function using a well-known line growth dither, clustered-dot dithering, and the like, and selects an image forming pattern under the control of the CPU 110. The dither is input from an image forming pattern input unit 302.

C, M, Y, and K signals output from the image forming pattern processing unit 108 are sent to the printer unit 200. Based on a control program held in a ROM 111, the CPU 110 comprehensively controls all the building components of the image processing unit 209 by using a RAM 112 as a work memory. For example, the CPU 110 controls to set parameters in the resolution conversion unit 107, image forming pattern processing unit 108, and the like. The CPU 110 also controls an operation/display unit 114 and a network I/F 113 for communicating with an external device, and inputs/outputs image information and device information. That is, the CPU 110 functions as a processor for controlling the overall system.

The operation/display unit 114 notifies the CPU 110 of information input by the user. The operation/display unit 114 functions as a setting unit which accepts designation of an image receiving apparatus serving as a transmission destination, and a transmission mode for processing image data in the image receiving apparatus.

An HDD (Hard Disk Drive) 115 stores system software, general image data, and output image data. The user can set the contents of the HDD 115. A raster image processor (RIP) 116 can rasterize a PDL code into a bitmap image, and send it as L*, a*, and b* signals or C, M, Y, and K signals to a unit preceding or subsequent to the output direct mapping unit 106.

A density conversion unit 120 holds a table for converting input, R, G, and B luminance signals into complementary color signals R→C, G→M, and B→Y, and as for BK, holds a G→BK table different from the G→M table.

A multi-valued data output/input unit 303 is an I/F for inputting externally received image data, and extracting image data to the outside.

Similarly, a half-tone data output/input unit 304 is an I/F for extracting half-tone image data within the image processing unit 209, inputting externally received half-tone image data to the printer unit, and performing print processing. In the image transmitting apparatus, the half-tone data output/input unit 304 functions as a half-tone image data transmitting unit. In the image receiving apparatus, the half-tone data output/input unit 304 functions as a receiving unit.

<Structures of ROM and RAM>

Figure 4:
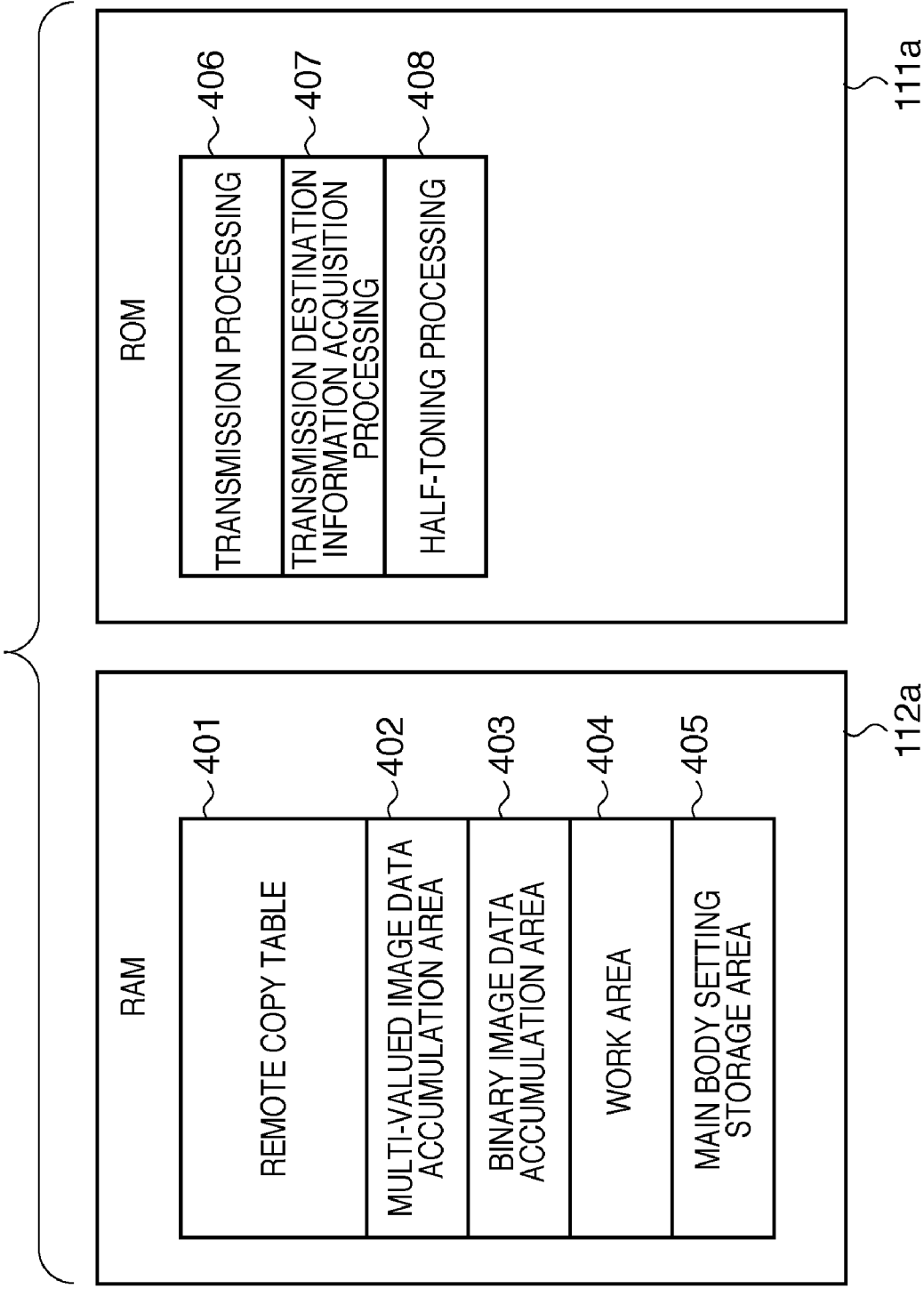
FIG. 4 is a view showing the structures of the ROM and RAM of an image transmitting apparatus.
Figure 5:
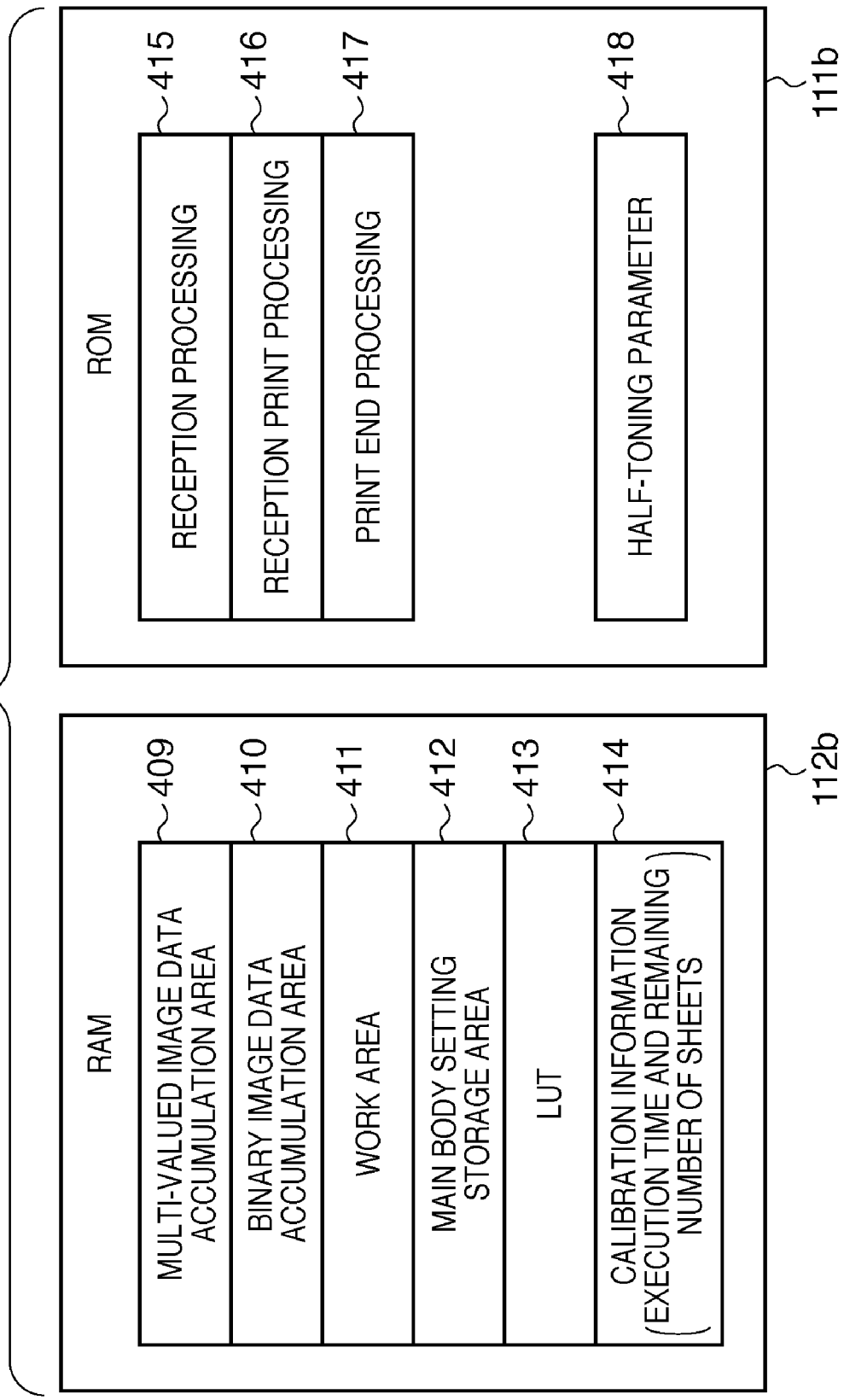
FIG. 5 is a view showing the structures of the ROM and RAM of an image receiving apparatus.

FIGS. 4 and 5 show program modules stored in ROMs 111a and 111b and RAMs 112a and 112b of the image transmitting apparatus and image receiving apparatus according to the present invention.

FIG. 4 is a view showing the structures of program modules stored in the ROM 111a and RAM 112a of the image transmitting apparatus.

The RAM 112a includes a remote copy table 401 for holding information of an image receiving apparatus, a multi-valued image data accumulation area 402 for temporarily holding a transmission image, and a binary image data accumulation area 403 for temporarily holding binary image data. The RAM 112a also includes a program work area 404, and a main body setting storage area 405 for storing the settings of the image transmitting apparatus main body and the like.

The ROM 111a includes a transmission module 406, transmission destination information acquisition module 407, and half-toning module 408.

FIG. 5 is a view showing the structures of the ROM 111b and RAM 112b of the image receiving apparatus.

The RAM 112b includes a multi-valued image data accumulation area 409 for holding a received image, and a binary image data accumulation area 410 for temporarily holding binary image data. The RAM 112b also includes a program work area 411, a main body setting area 412 for storing the settings of the main body and the like, an LUT 413 corresponding to the state of the image processing unit, and an area 414 for holding calibration information.

The ROM 111b includes a reception module 415, a reception print processing module 416, a print end processing module 417, and a half-toning parameter 418 which is a parameter specific to the image processing unit.

<Calibration>

Figure 6:
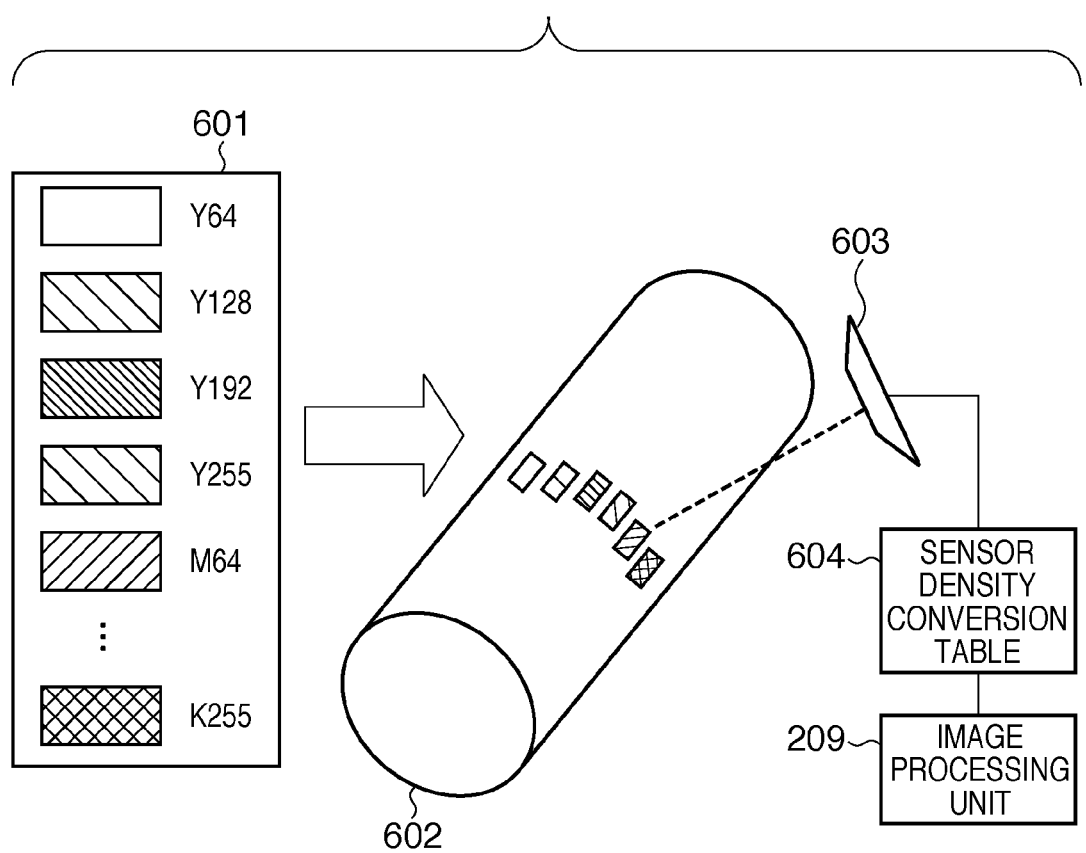
FIG. 6 is a view for explaining a concrete arrangement for density measurement.

Calibration, which is adjustment based on density measurement, is performed, particularly in a color printer to acquire a predetermined tint. FIG. 6 is a view for explaining a concrete arrangement for density measurement.

In FIG. 6, a patch pattern 601 is used to measure the density. Patches at a plurality of predetermined density levels among density levels 0 to 255 are printed for each of printout color components (Y, M, C, and K). The patch pattern 601 is formed on a photoconductive drum 602 in the printer unit 200. More specifically, a latent image corresponding to the patch pattern 601 is formed on the photoconductive drum by general electrophotographic printing using a laser beam. Toner is applied to the latent image, developing the patch pattern 601. A sensor 603 measures the densities of the respective patches. Each measured density value is converted using a sensor density value-to-print density value conversion table 604. The converted density value is input to the image processing unit 209, generating a lookup table (LUT).

The density measurement is executed at a timing set by the user. For example, the density measurement is performed every predetermined cumulative number of printed sheets upon power-on, such as every 50 or 200 printed sheets upon power-on. Alternatively, the density measurement is executed every time a predetermined time such as 30 min has elapsed. Alternatively, the density measurement is executed when the environment such as the internal temperature or humidity changes.

<Processing Sequence in Image Transmitting Apparatus>

Figure 7:
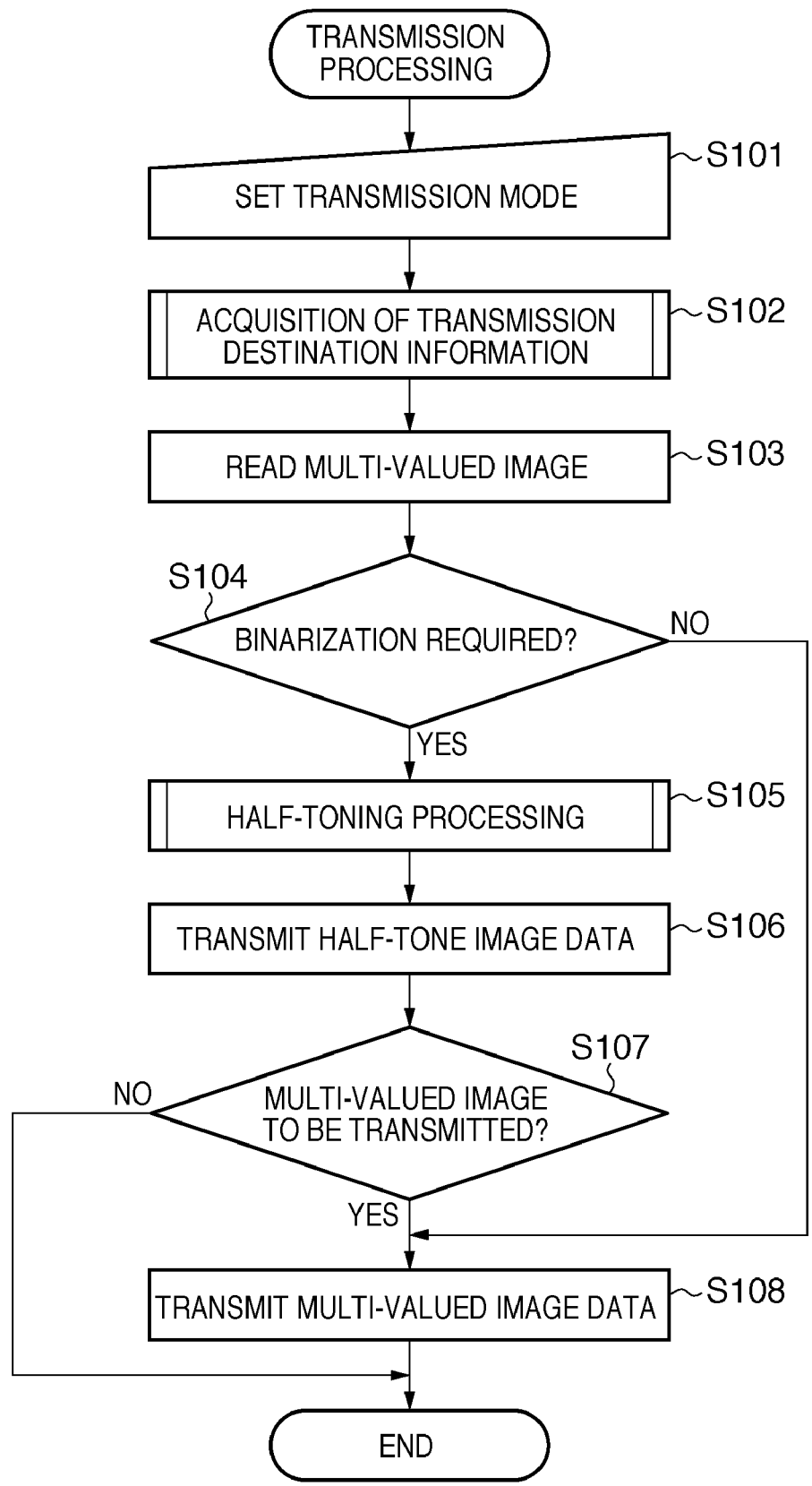
FIG. 7 is a flowchart for explaining the sequence of image data transmission processing in the image transmitting apparatus.

Processing in the image transmitting apparatus will be explained with reference to the flowcharts of FIGS. 7 to 10. FIG. 7 is a flowchart for explaining the sequence of image data transmission processing in the image transmitting apparatus. Control of the operation unit, input and output of data from each image processing unit, and determination of processing are executed under the control of the CPU 110 using program codes, work areas, and tables stored in the ROM and RAM of FIG. 3.

In S101, the operator 500 makes operation settings such as remote copy using the operation unit of the image transmitting apparatus 501. More specifically, the operator 500 makes the transmission destination setting, and parameter settings (e.g., transmission mode (remote copy, BOX delivery, or the like), paper size, the number of copies, page layout, double-sided setting, and accumulation BOX number).

In S102, information representing the operating state of an image receiving apparatus set as a transmission destination, and information (e.g., a lookup table (LUT) and image forming pattern) representing the characteristics of the image processing unit 209 in the image receiving apparatus are acquired (transmission destination information acquisition processing). The sequence of the transmission destination information acquisition processing will be explained later with reference to FIG. 8.

In S103, the reader unit 207 reads a document image. By this processing, a multi-valued image is input to the multi-valued data output/input unit 303. The reader unit 207 and multi-valued data output/input unit 303 function as a multi-valued image data generation unit which generates multi-valued image data from a document image.

In S104, based on the transmission mode set in S101 and the information which has been acquired in S102 and represents the state of the image receiving apparatus serving as a transmission destination, the CPU 110 determines whether image data to be transmitted needs to be binarized. Based on the information on the operating state of the image receiving apparatus and information on execution of calibration of the image processing unit, the CPU 110 determines whether the image processing unit of the image receiving apparatus can execute print processing (determination of print processing). If the CPU 110 determines that the image processing unit of the image receiving apparatus cannot execute print processing, the CPU 110 determines that no image data need be binarized.

If the CPU 110 determines in S104 that no image data need be binarized (NO in S104), the process advances to S108. The CPU 110 acquires multi-valued image data input to the multi-valued data output/input unit 303, and transmits it to the image receiving apparatus serving as a transmission destination. In the image transmitting apparatus, the multi-valued data output/input unit 303 functions as a multi-valued image data transmitting unit. In the image receiving apparatus, the multi-valued data output/input unit 303 functions as a receiving unit.

If the transmission destination apparatus can print and remote copy is set as a transmission mode using the "copy" function of the transmission destination apparatus, the CPU 110 determines in S104 that image data to be transmitted needs to be binarized. In this case, to transmit the image data as half-tone image data, the process advances to S105. For example, if information representing the state of the transmission destination apparatus represents that the apparatus operates normally (the apparatus is not in an error state), print sheets are stored in the paper feed tray, and the apparatus is not executing calibration, the CPU 110 determines that the transmission destination apparatus can print. By network protocol-compliant communication with the transmission destination apparatus, the CPU 110 can acquire information representing the state of the transmission destination apparatus. When the copy function is used, a half-tone image is transmitted in order to increase the response speed by decreasing the image data size using half-tone data and shortening the transfer time because the copy function requests immediacy.

In S105, half-toning processing is done. Details of the half-toning processing will be described below with reference to FIG. 9.

In S106, the CPU 110 transmits the half-tone image data to the image receiving apparatus designated as a transmission destination.

In S107, upon completion of transmitting the half-tone image data, the CPU 110 determines whether to transmit multi-valued image data to the image receiving apparatus designated as a transmission destination. Based on the transmission mode set in step S101, the CPU 110 determines whether to transmit multi-valued image data. When reuse of image data is requested in the transmission mode in addition to the copy function, for example, when "remote copy" and "BOX delivery" are simultaneously set, the CPU 110 determines to transmit multi-valued image data.

Since the copy function requires high response speed until the completion of print processing after transmitting image data in order to print image data within a short time, half-tone image data is transmitted. At the same time, when a transmission mode requiring image data reusability, for example, BOX delivery is set, the image transmitting apparatus transmits half-tone image data for the copy function requiring high response speed, and then transmits multi-valued image data. As a result, the half-tone image data is transmitted first, and then the image receiving apparatus serving as a transmission destination quickly executes print processing. Upon receiving the multi-valued image data, the image receiving apparatus can reuse image data based on the multi-valued image data.

If the CPU 110 determines in S107 to transmit multi-valued image data (YES in S107), the process advances to step S108.

In S108, the CPU 110 acquires multi-valued image data input to the multi-valued data output/input unit 303, and transmits the multi-valued image data and transmission mode to the image receiving apparatus serving as a transmission destination.

If the CPU 110 determines in S107 on the basis of the set transmission mode that the image receiving apparatus serving as a transmission destination does not request reuse of image data, it ends the process.

<Transmission Destination Information Acquisition Processing>

Figure 8:
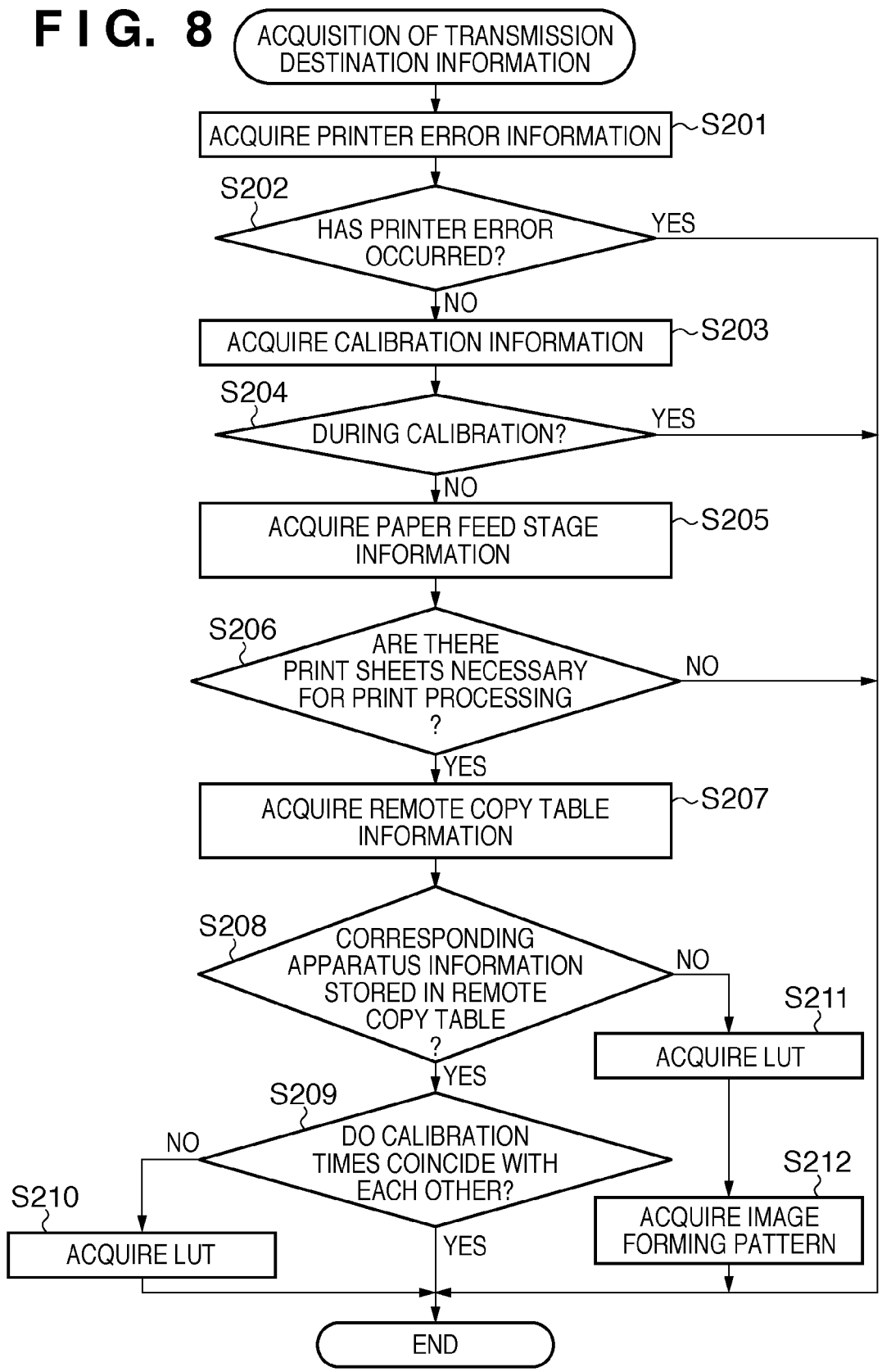
FIG. 8 is a flowchart for explaining the sequence of transmission destination information acquisition processing in the image transmitting apparatus.

The sequence of transmission destination information acquisition processing in S102 of FIG. 7 will be explained with reference to the flowchart of FIG. 8. This processing is executed under the control of the CPU 110 using program codes, work areas, and tables stored in the ROM and RAM of FIG. 3. The RAM 112*a* stores even parameters in a remote copy table such as a lookup table (LUT) corresponding to the image receiving apparatus serving as a transmission destination.

In S201, the CPU 110 communicates with the image receiving apparatus serving as a transmission destination to acquire information (printer error information) on an operating state representing whether the image receiving apparatus is in an error state. In response to the printer error information acquisition request from the image transmitting apparatus, the image receiving apparatus transmits, to the image transmitting apparatus, printer error information of the image receiving apparatus, and identification information (apparatus ID) for identifying the image receiving apparatus.

In S202, the CPU 110 analyzes the printer error information acquired in the preceding step S201. Based on the analysis result, the CPU 110 determines whether the image receiving apparatus identified by the identification information (apparatus ID) operates normally or is in an error state. If the image receiving apparatus is in an error state, for example, when the image receiving apparatus cannot execute print processing quickly because sheets run out or the printer engine has failed, the CPU 110 determines that a printer error has occurred (YES in S202), and ends the transmission destination information acquisition processing.

If the CPU 110 determines that the image receiving apparatus operates normally, it determines that no printer error has occurred (NO in S202), and the process advances to S203.

In S203, the CPU 110 communicates with the image receiving apparatus serving as a transmission destination to acquire information (calibration information) on execution of calibration. The calibration information includes the execution time, the end time, information (LUT and image forming pattern) representing the characteristics of the image processing unit, the number of sheets printable until the start of the next calibration, and the contents of an operation executed when the number of printed sheets reaches a calibration start count. In response to the calibration information acquisition request from the image transmitting apparatus, the image receiving apparatus transmits, to the image transmitting apparatus, calibration information of the image receiving apparatus, and identification information (apparatus ID) for identifying the image receiving apparatus.

In S204, the CPU 110 analyzes the calibration information acquired in the preceding step S203. The CPU 110 identifies a transmission destination apparatus in accordance with the apparatus ID. Based on the calibration execution time and end time, the CPU 110 determines whether the image receiving apparatus serving as a transmission destination is executing calibration. If the image receiving apparatus is executing calibration at the timing when the calibration information is acquired from the image transmitting apparatus (YES in S204), the transmission destination information acquisition processing ends.

If the CPU 110 determines that the image receiving apparatus is not executing calibration, for example, if the current time is the calibration end time, the CPU 110 of the image transmitting apparatus determines that the image receiving apparatus is not executing calibration.

In S205, the CPU 110 communicates with the image receiving apparatus serving as a transmission destination to acquire information (paper feed tray information) representing whether print sheets necessary for print processing are stored in the paper feed tray (paper feed stage). The paper feed tray information includes information on, for example, the print sheet size (e.g., A4, A3, or B5) and the print sheet type (e.g., plain paper, wood-free paper, or OHP). In response to the paper feed tray information acquisition request from the image transmitting apparatus, the image receiving apparatus transmits, to the image transmitting apparatus, paper feed tray information of the image receiving apparatus, and identification information (apparatus ID) for identifying the image receiving apparatus. The CPU 110 of the image transmitting apparatus identifies a transmission destination apparatus in accordance with the apparatus ID. Based on the paper feed tray information, the CPU 110 determines whether print sheets used in remote copy are stored in the image receiving apparatus serving as a transmission destination.

In S206, the CPU 110 analyzes the paper feed tray information acquired in the preceding step S205. The CPU 110 identifies a transmission destination apparatus in accordance with the apparatus ID. The CPU 110 determines whether print sheets corresponding to the print sheet size and print sheet type designated by remote copy settings are stored in the paper feed tray of the image receiving apparatus serving as a transmission destination. If the CPU 110 determines that print sheets necessary for print processing are not stored (NO in S206), the transmission destination information acquisition processing ends.

If the CPU 110 determines that print sheets necessary for print processing are stored in the paper feed tray of the image receiving apparatus serving as a transmission destination (YES in S206), the process advances to step S207.

In S207, the CPU 110 looks up a table (remote copy table) which stores remote copy destination information. Based on identification information (ID) of the image receiving apparatus selected as a transmission destination, the CPU 110 acquires parameters corresponding to the image receiving apparatus as remote copy table information. Details of the remote copy table will be explained later with reference to FIG. 11.

In S208, the CPU 110 looks up the remote copy table to determine whether the remote copy table stores information of an apparatus corresponding to the image receiving apparatus serving as a transmission destination. If the CPU 110 determines in S208 that the remote copy table does not store information of the corresponding apparatus (NO in S208), the process advances to S211.

In S211, the CPU 110 of the image transmitting apparatus communicates with the image receiving apparatus to acquire a lookup table (LUT) as information representing the characteristics of the image processing unit 209 in the image receiving apparatus.

In S212, the CPU 110 of the image transmitting apparatus acquires, from the image receiving apparatus, an image forming pattern for generating half-tone data from multi-valued image data, for example, various dither parameters from the image receiving apparatus.

The lookup table (LUT) and image forming pattern acquired in S211 and S212 are stored in the remote copy table as information representing the characteristics of the image processing unit of the image receiving apparatus corresponding to the apparatus ID.

If the CPU 110 determines in S208 that the remote copy table stores information of the corresponding image receiving apparatus (YES in S208), the process advances to S209.

In S209, the CPU 110 compares the calibration information acquired from the image receiving apparatus with calibration information stored in the remote copy table (storage unit). For example, the CPU 110 of the image transmitting apparatus compares pieces of calibration execution time information to determine whether they coincide with each other. If the pieces of calibration execution time information coincide with each other as a result of the comparison, the LUT stored in the remote copy table of the image transmitting apparatus is identical to one at the transmission destination, and the transmission destination information acquisition processing ends. Information to be compared is not limited to the calibration execution time, and suffices to be information such as the calibration end time or LUT which can be used to determine whether the image receiving apparatus has executed calibration.

If the CPU 110 determines in S209 that the pieces of calibration execution time information do not coincide with each other, it determines that the LUT stored in the remote copy table does not coincide with one updated after calibration in the image receiving apparatus.

In S210, the CPU 110 of the image transmitting apparatus communicates with the image receiving apparatus to acquire an LUT held in the image receiving apparatus as information representing the characteristics of the image processing unit. The LUT stored in the remote copy table is updated by one acquired from the image receiving apparatus, and the transmission destination information acquisition processing ends.

<Half-Toning Processing>

Half-toning processing in S105 of FIG. 7 will be explained with reference to the flowchart of FIG. 9. This processing is executed under the control of the CPU 110 using program codes, work areas, and tables stored in the ROM and RAM. This processing can convert multi-valued image data into half-tone image data corresponding to the characteristics of the image processing unit of an image receiving apparatus designated to process image data.

In S301, the CPU 110 sets an LUT corresponding to an image receiving apparatus in the output direct mapping unit 106 of FIG. 3 from the LUT input unit 301, and executes luminance density conversion control.

In S302, the resolution conversion unit 107 performs resolution conversion processing under the control of the CPU 110. More specifically, the resolution conversion unit 107 executes resolution conversion processing complying with a desired resolution of a final image, such as 600 dpi or 1,200 dpi.

In S303, the image forming pattern processing unit 108 performs image forming pattern processing under the control of the CPU 110. More specifically, the image forming pattern processing unit 108 sets, from the image forming pattern input unit 302, an image forming pattern corresponding to the image processing unit of the image receiving apparatus. The image forming pattern processing unit 108 applies the image forming pattern to each density value to convert multi-valued data into half-tone data. The half-tone image data is acquired from the half-tone data output/input unit 304 in FIG. 3.

<Processing Sequence in Image Receiving Apparatus>

Figure 10:
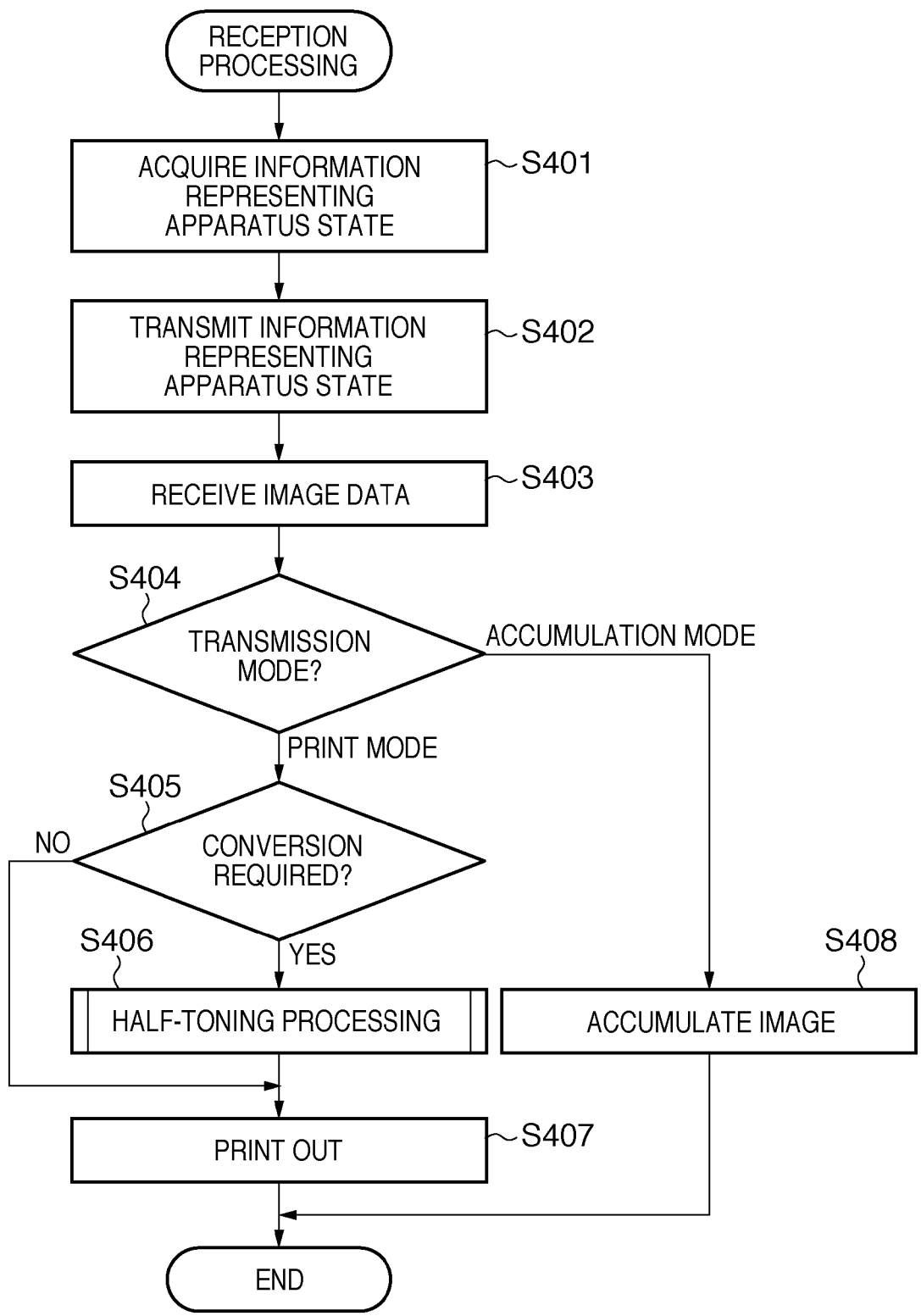
FIG. 10 is a flowchart for explaining the sequence of processing in the image receiving apparatus.

The sequence of processing in the image receiving apparatus will be explained with reference to the flowchart of FIG. 10. In S401, the CPU 110 of the image receiving apparatus acquires information representing the state of the image receiving apparatus in preparation for an apparatus state acquisition request from the image transmitting apparatus. The information representing the state of the image receiving apparatus includes, for example, printer error information, calibration information, and paper feed tray information described with reference to FIG. 8.

In S402, upon receiving an apparatus state acquisition request from the image transmitting apparatus, the CPU 110 of the image receiving apparatus 503 transmits the information which has been acquired in the preceding step S401 and represents an apparatus state.

In S403, the image receiving apparatus receives image data transmitted from the image transmitting apparatus.

In S404, the CPU 110 of the image receiving apparatus determines, in accordance with a transmission mode designated in the transmitted image data, which of a print mode in which print processing is done for image data and an accumulation mode in which image data can be reused is set. The CPU 110 of the image receiving apparatus determines that the print mode is set when the transmission mode sent together with the image data is "remote copy", and that the accumulation mode is set when the transmission mode is "BOX delivery". If the CPU 110 determines in S404 that the accumulation mode is set, the process advances to S408. In S408, the CPU 110 executes processing (image accumulation processing) to accumulate, in a BOX, image data transmitted from the image transmitting apparatus.

If the CPU 110 determines in S404 that the print mode is set, the process advances to S405. In S405, the CPU 110 of the image receiving apparatus determines whether the image data needs to be converted when executing print processing in the image receiving apparatus. More specifically, when the image data is multi-valued one, it needs to be converted into half-tone image data in order to send it to the image processing unit. In accordance with the format of the image data, the CPU 110 determines whether the image data needs to be converted.

Figure 9:
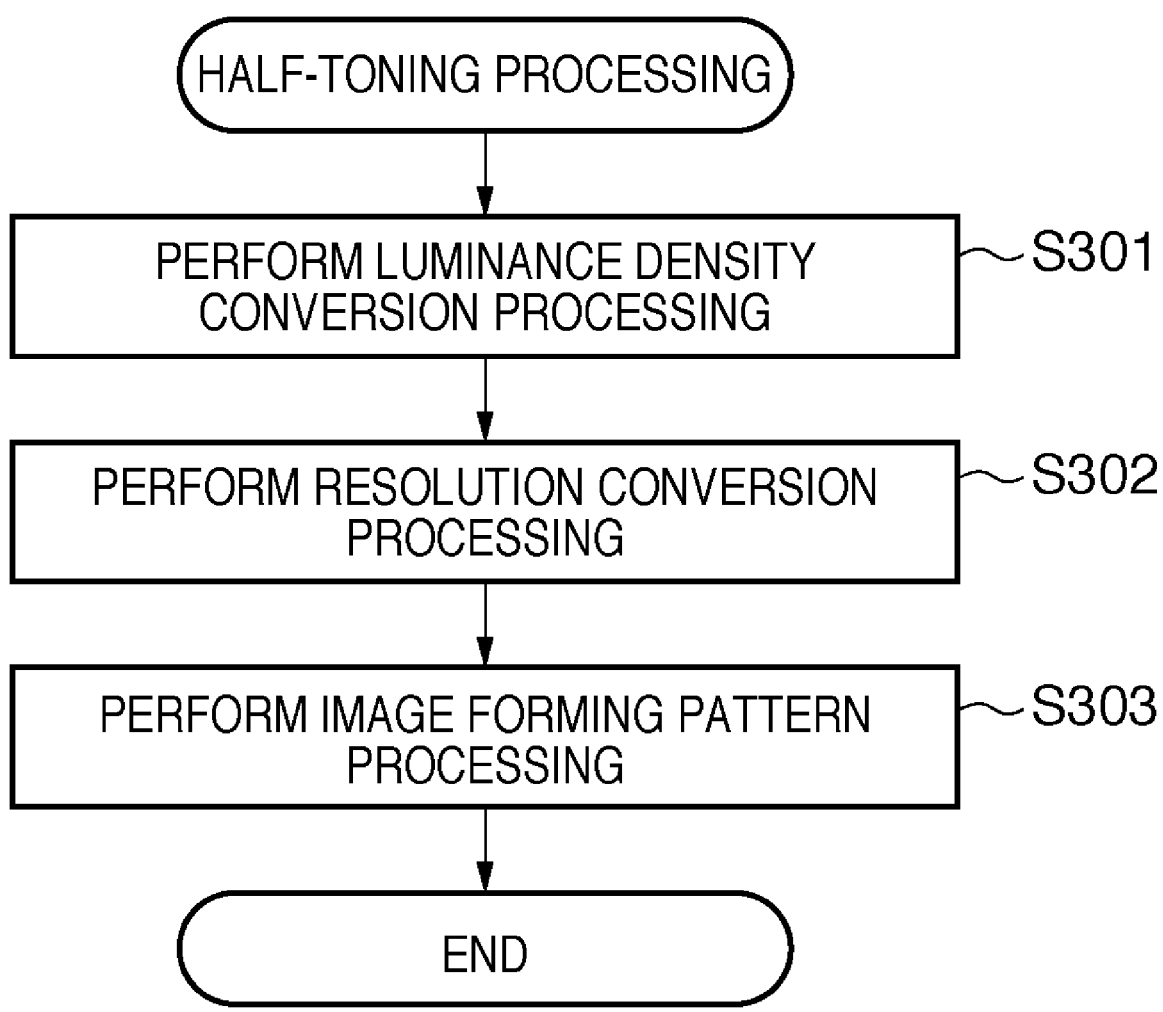
FIG. 9 is a flowchart for explaining the sequence of halftoning processing.

If the CPU 110 determines in S405 that the image data needs to be converted (YES in S405), the process advances to S406 to execute the above-described half-toning processing (FIG. 9). If the CPU 110 determines in S405 that the image data transmitted from the image transmitting apparatus is half-tone image data, the process advances to S407.

In S407, the CPU 110 sends the image data to the printer unit 200 to execute print processing.

<Remote Copy Table>

The remote copy table will be explained with reference to FIG. 11. The remote copy table is stored in the RAM 112a of the image transmitting apparatus, and can be looked up by the CPU 110. The remote copy table stores identification information for identifying an image receiving apparatus, and calibration information corresponding to each image receiving apparatus. The calibration information includes the execution time, the end time, information (LUT and image forming pattern) representing the characteristics of the image processing unit, the number of sheets printable till the start of the next calibration, and the contents of an operation executed when the number of printed sheets reaches a calibration start count.

After acquiring pieces of information from each apparatus, the CPU 110 sequentially inserts the acquired pieces of information in the top of the remote copy table. When information on the same apparatus identified by identification information has already been stored, the information on the apparatus is updated to the latest information.

<Processing Sequence of Remote Copy (Processing in Image Transmitting Apparatus)>

Figure 13:
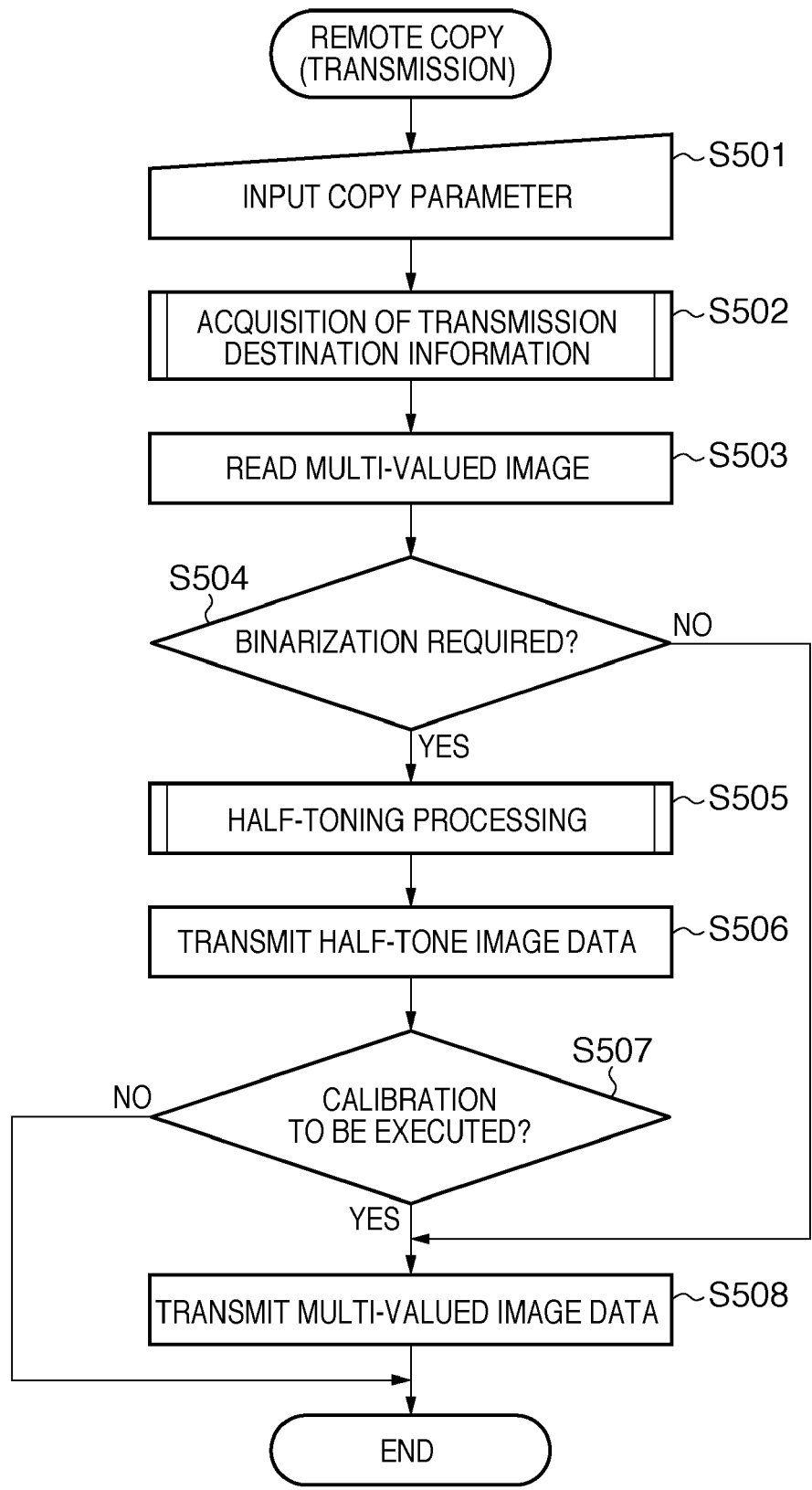
FIG. 13 is a flowchart for explaining the sequence of transmission processing in remote copy.

The processing sequence of remote copy will be explained with reference to the flowcharts of FIGS. 13 to 16. FIG. 13 is a flowchart for explaining the sequence of processing in the image transmitting apparatus. This processing is executed under the control of the CPU 110 using program codes, work areas, and tables stored in the ROM and RAM of the image transmitting apparatus.

In S501, the operator performs an operation for remote copy using the operation unit of the image transmitting apparatus. For example, the operator makes the transmission destination setting, and remote copy parameter settings (e.g., transmission mode (remote copy in this case), paper size, the number of copies, page layout, and double-sided setting).

In S502, the image transmitting apparatus acquires information (transmission destination information) on an image receiving apparatus serving as a transmission destination.

In S503, the reader unit 207 reads a document image. By this processing, a multi-valued image is input to the multi-valued data output/input unit 303.

In S504, based on the transmission mode set in S501 and the transmission destination information which has been acquired in S502 and represents the state of the image receiving apparatus serving as a transmission destination, the CPU 110 of the image transmitting apparatus determines whether image data to be transmitted needs to be binarized.

When the transmission destination information represents that the image receiving apparatus is not in an error state, necessary print sheets are stored in the paper feed tray, and no calibration is in execution, the CPU 110 of the image transmitting apparatus determines that the image receiving apparatus can print. In this case, the CPU 110 determines that the image data needs to be binarized (YES in S504), and the process advances to S505.

In S505, the CPU 110 of the image transmitting apparatus performs half-toning processing. The half-toning processing has already been explained with reference to the flowchart of FIG. 9, and a description thereof will not be repeated.

In S506, the CPU 110 of the image transmitting apparatus transmits the image data (half-tone image data) having undergone half-toning processing to the image receiving apparatus serving as a transmission destination. After the end of transmitting the half-tone image data, the process advances to S507. The CPU 110 of the image transmitting apparatus determines whether the image receiving apparatus executes calibration (interrupt determination). Based on the determination result, the CPU 110 of the image transmitting apparatus transmits multi-valued image data to the image receiving apparatus.

Assume that the image transmitting apparatus holds the remote copy table shown in FIG. 11. Also, assume that the image receiving apparatus is an apparatus of an apparatus ID "0023" in FIG. 11, and remote copy of printing a 1-page document by 300 copies is set. When the image receiving apparatus prints by the number of copies designated by the image transmitting apparatus, it prints a total of 300 pages to create 300 copies of one page. Printing of 300 pages exceeds "208" which is the number of sheets printable till the start of calibration in the apparatus of the apparatus ID "0023". This meets the condition to start calibration.

In the remote copy table, it is set to "execute calibration" in the apparatus of the apparatus ID "0023" when the number of printed sheets reaches a calibration start count. If the cumulative number of printed sheets reaches "208" during printing of 300 pages, the CPU 110 of the image transmitting apparatus determines, to start calibration on the basis of the setting to "execute calibration" in the apparatus of the apparatus ID "0023". Then, the process advances to S508.

If calibration occurs during printing, an LUT whose characteristics change over time is generated again. More specifically, LUT information ((R,G,B)→(C,M,Y,K)) formed from a given combination of luminance data and a combination of density data changes into (R,G,B)→(C',M',Y',K') after calibration. Tints reproduced in C, M, Y, and K by the image processing unit change over time. Luminance density conversion corresponding to the state of the image processing unit can be achieved by performing calibration and reconstructing an LUT which links C, M, Y, and K changed over time with corresponding pieces of R, G, and B luminance information. By the luminance density conversion, the continuity of LUT information can be maintained before and after calibration.

To perform luminance density conversion corresponding to the state of the image processing unit, luminance data is required. When calibration is done, image data needs to be created again from R, G, and B luminance data (multi-valued luminance data). For this reason, in S508, the image transmitting apparatus transmits multi-valued image data to the image receiving apparatus.

If the CPU 110 of the image transmitting apparatus determines in S507 that no calibration is executed (NO in S507), the process ends.

<Processing Sequence of Remote Copy (Processing in Image Receiving Apparatus)>

Figure 14:
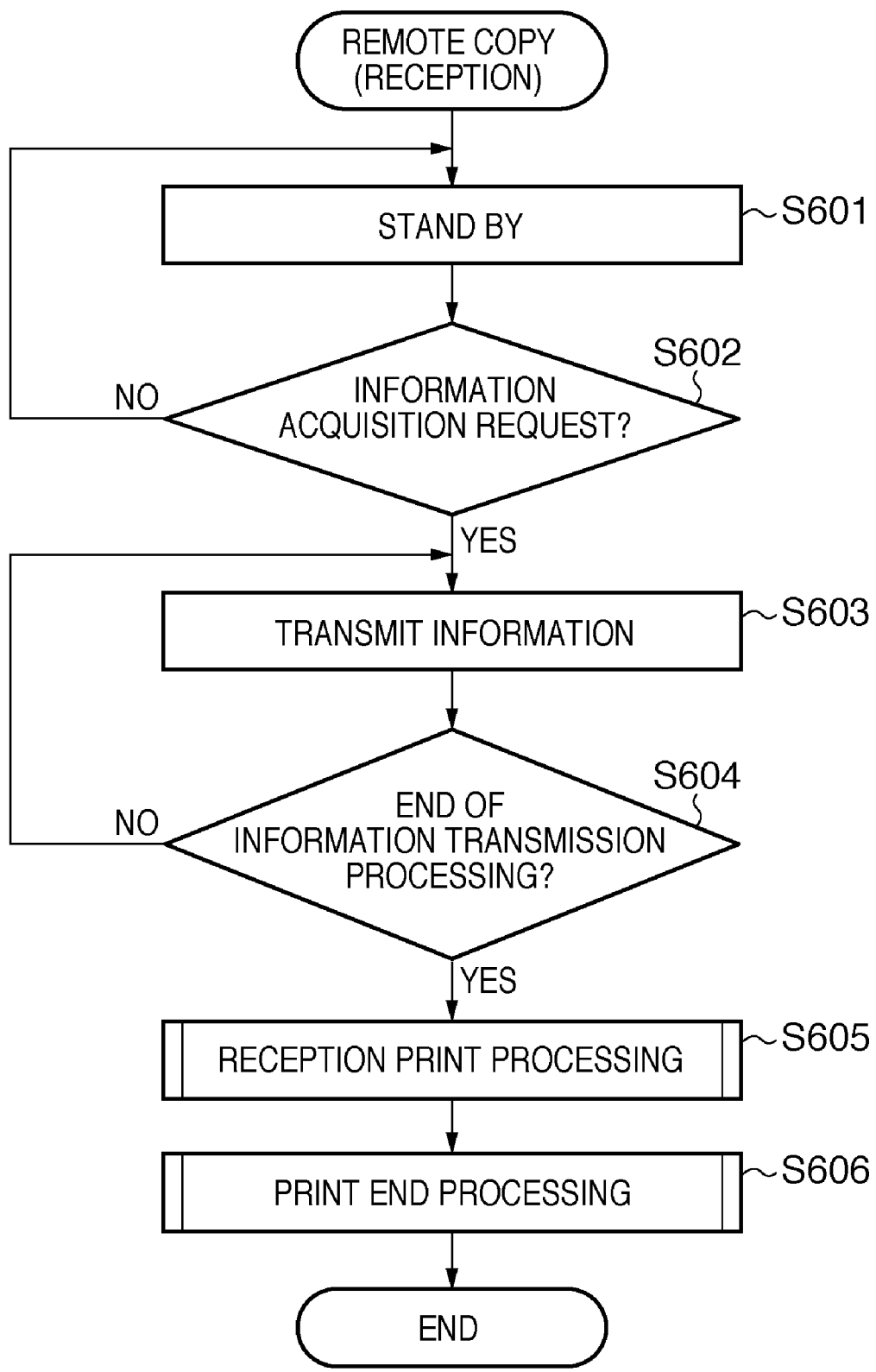
FIG. 14 is a flowchart for explaining the sequence of reception processing in remote copy.

The sequence of processing in the image receiving apparatus will be explained. FIG. 14 is a flowchart for explaining the sequence of processing in the image receiving apparatus. This processing is executed under the control of the CPU 110 using program codes, work areas, and tables stored in the ROM and RAM of the image receiving apparatus.

In S601, the receiving side (image receiving apparatus) in remote copy stands by.

In S602, the CPU 110 of the image receiving apparatus determines whether it has received an information acquisition request command. If the CPU 110 of the image receiving apparatus determines that it has not received an information acquisition request command (NO in S602), it continues to stand by. If the CPU 110 of the image receiving apparatus determines that it has received an information acquisition request command (YES in S602), the process advances to S603.

In S603, the CPU 110 of the image receiving apparatus transmits the following information in response to a request from the image transmitting apparatus.

The CPU 110 of the image receiving apparatus transmits information representing the state of the image processing unit, printer error information, calibration information, and paper feed tray information in response to a request from the image transmitting apparatus.

In S604, the CPU 110 of the image receiving apparatus determines whether the information transmission processing has ended. If no information transmission processing has ended (NO in S604), the CPU 110 of the image receiving apparatus continues the information transmission processing (S603). If the information transmission processing has ended (YES in S604), the process advances to S605.

In S605, the CPU 110 of the image receiving apparatus executes reception print processing. The contents of this processing will be described with reference to FIG. 15.

In S606, the CPU 110 of the image receiving apparatus executes print end processing after the reception print processing. The contents of this processing will be described with reference to FIG. 16.

<Reception Print Processing (FIG. 15)>

Figure 15:
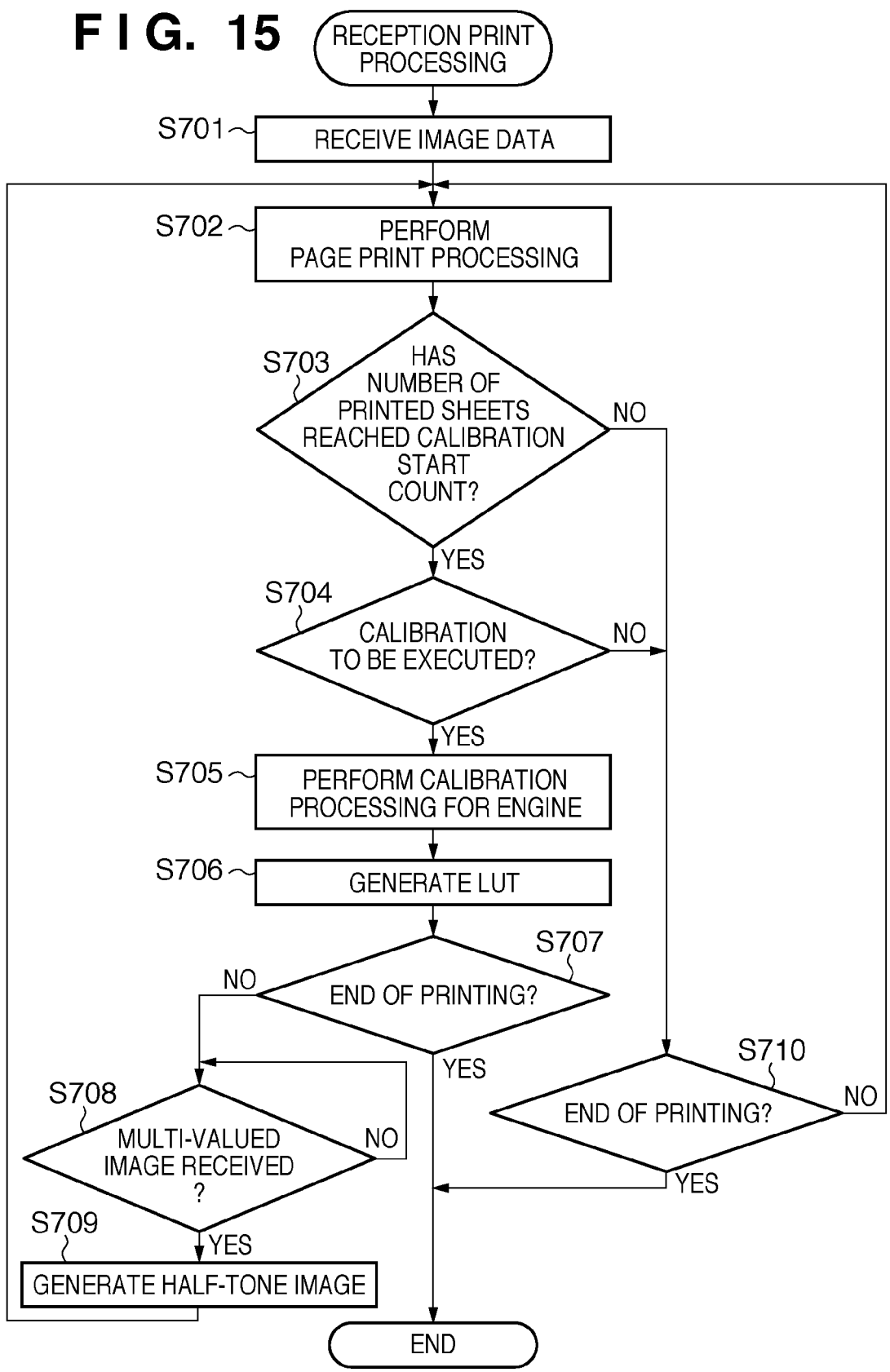
FIG. 15 is a flowchart for explaining the sequence of reception print processing.

The sequence of reception print processing in the image receiving apparatus will be explained with reference to the flowchart of FIG. 15.

In S701, the CPU 110 of the image receiving apparatus performs reception processing to receive a multi-valued image or half-tone image transmitted from the image transmitting apparatus. For example, when half-tone image data is to be transmitted, it is input from the half-tone data output/input unit 304 in FIG. 3. Then, the half-tone image data is sent to the printer unit 200 to execute print processing for each page.

When multi-valued image data is to be transmitted, it is input from the multi-valued data output/input unit 303 in FIG. 3. The multi-valued image data is converted from the luminance into the density in accordance with an LUT held in the image receiving apparatus. To convert multi-valued data into half-tone data, half-toning processing is executed using image forming parameters. The half-tone image data is sent to the printer unit 200 to execute print processing for each page.

In S703, the CPU 110 of the image receiving apparatus determines whether to start calibration after printing each page.

For example, for the apparatus of the apparatus ID "0023" in the remote copy table shown in FIG. 11, the number of sheets printable till the start of calibration is "208". An operation executed when the number of printed sheets reaches a calibration start count is to "execute calibration". Hence, when the image transmitting apparatus designates remote copy of 300 sheets, the image receiving apparatus starts calibration during printing. As the number of sheets printed by the image receiving apparatus increases by one, "208", which is the number of printable sheets, is decremented by one. When the number of printed sheets reaches 208, the number of printable sheets becomes 0. The CPU 110 of the image receiving apparatus monitors the number of printable sheets. When the number of printable sheets reaches 0, the CPU 110 of the image receiving apparatus determines that the number of printed sheets has reached the calibration start count, and controls the operation of the image receiving apparatus to execute the set operation.

If the CPU 110 of the image receiving apparatus determines in S703 that the cumulative number of printed sheets has not reached the calibration start count (NO in S703), the process advances to S710. If the CPU 110 of the image receiving apparatus determines in S710 that no print processing has ended (NO in S710), the process returns to S702 to continue the page print processing. If the CPU 110 of the image receiving apparatus determines in S710 that the print processing has ended (YES in S710), the process ends.

If the CPU 110 of the image receiving apparatus determines in S703 that the cumulative number of printed sheets has reached the calibration start count (YES in S703), the process advances to S704.

In S704, the CPU 110 of the image receiving apparatus determines whether to execute calibration. If the CPU 110 of the image receiving apparatus determines not to execute calibration (NO in S704), the process advances to S710. If print processing is to continue (NO in S710), the process returns to S702 to continue the page print processing. If no print processing is to continue (YES in S710), the process ends.

Based on the setting of an operation executed when the number of printed sheets reaches a calibration start count, the CPU 110 of the image receiving apparatus determines whether to execute calibration. For example, for the apparatus of the apparatus ID "0023" in the remote copy table, it is set to "execute calibration". Hence, the CPU 110 controls the image receiving apparatus to interrupt the print processing and execute calibration. For an apparatus of an apparatus ID "0813" in the remote copy table, it is set to "continue printing". Thus, the CPU 110 controls to continue printing without executing calibration (NO in S704).

If the CPU 110 of the image receiving apparatus determines in S704 to execute calibration, and the number of printed sheets reaches a calibration start count in a setting example of the apparatus of the apparatus ID "0023" in FIG. 11, the CPU 110 interrupts the print processing, and the process advances to S705.

In S705, the CPU 110 of the image receiving apparatus controls the operation of the image receiving apparatus to execute calibration.

The state of the image processing unit changes depending on the calibration result. Thus, in S706, a lookup table corresponding to the state of the image processing unit having undergone calibration is generated under the control of the CPU 110. Luminance density conversion of multi-valued image data is done in accordance with the lookup table. The CPU 110 of the image receiving apparatus functions as a characteristic update unit, and updates information representing the characteristics of the image processing unit on the basis of luminance density conversion.

In S707, the CPU 110 determines whether to end the print processing. If the CPU 110 determines that print processing of all pages has ended, the process ends.

If the CPU 110 determines in S707 that print processing of all pages has not ended, it shifts to S708 to determine whether multi-valued image data has been received. This is because when a newly generated LUT is used, multi-valued image data is necessary to perform luminance density conversion corresponding to the state of the calibrated image processing unit.

In S708, the CPU 110 of the image receiving apparatus determines whether it has received multi-valued image data from the image transmitting apparatus. If the CPU 110 of the image receiving apparatus has received multi-valued image data from the image transmitting apparatus (YES in S708), the process advances to S709.

To perform luminance density conversion corresponding to the state of the image processing unit after calibration, luminance data is required. When calibration is done, image data needs to be created again from R, G, and B luminance data (multi-valued luminance data).

In S709, the CPU 110 of the image receiving apparatus generates a half-tone image on the basis of multi-valued image data transmitted from the image transmitting apparatus. Then, the process returns to S702 to continue page print processing till the final page.

<Print End Processing (FIG. 16)>

Figure 16:
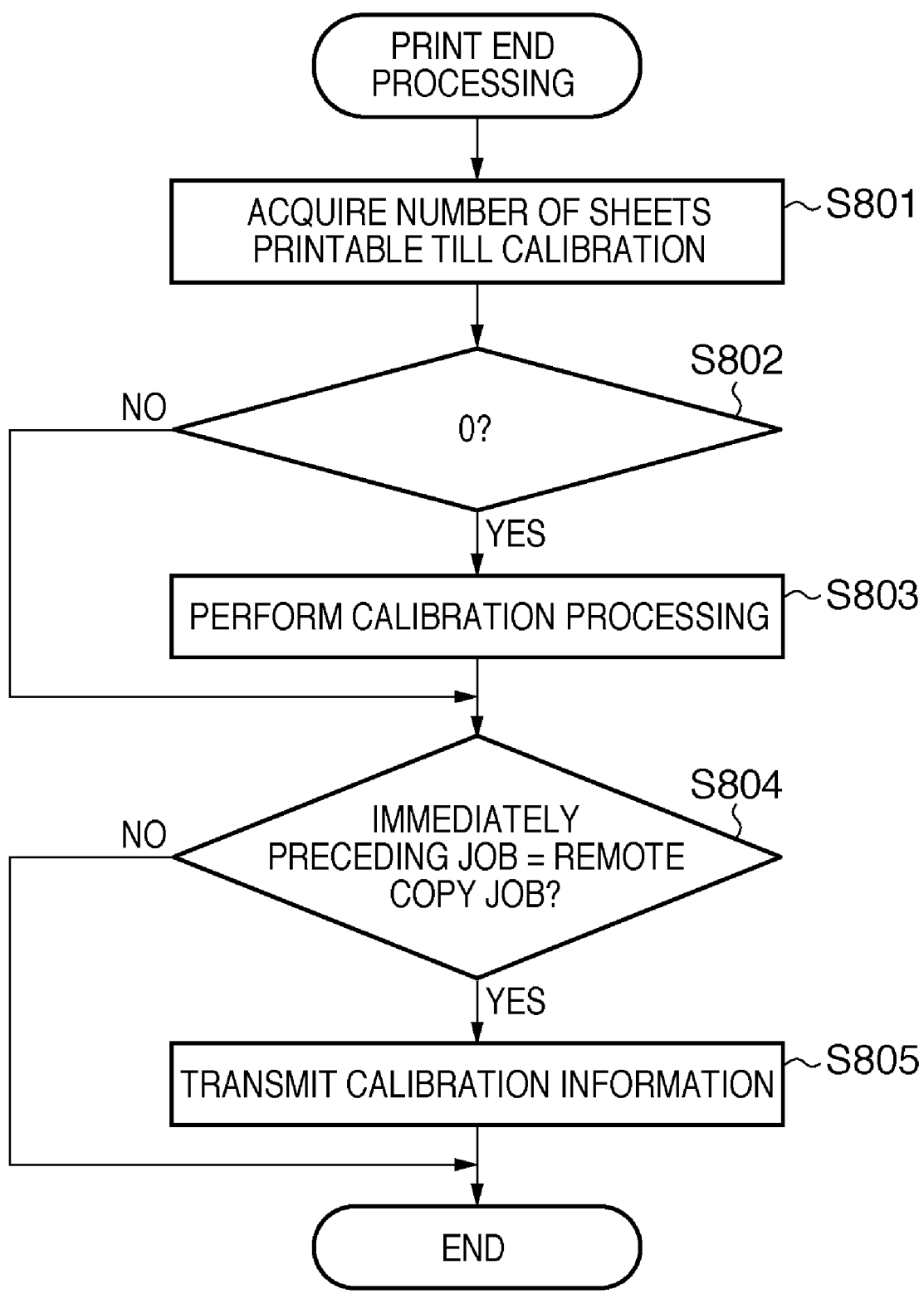
FIG. 16 is a flowchart for explaining the sequence of print end processing.

The sequence of print end processing in the image receiving apparatus will be explained with reference to the flowchart of FIG. 16.

In S801, the CPU 110 of the image receiving apparatus acquires information on the number of sheets printable until the start of calibration.

In S802, the CPU 110 of the image receiving apparatus determines whether the acquired number of printable sheets is "0". If the number of printable sheets is "0" (YES in S802), the process advances to S803. If the CPU 110 of the image receiving apparatus determines in S802 that the number of printable sheets has not reached "0" (NO in S802), the process advances to S804.

In S803, calibration is executed. Then, an LUT is newly generated to update calibration information. For example, as the calibration information, the calibration execution time is updated from T3 to T5, and the end time is updated from T4 to T6. The number of sheets printable till the start of the next calibration is updated from "12" (for the apparatus ID "0813": FIG. 11) before update to "500" (for the apparatus ID "0813": FIG. 12) after update.

In S804, the CPU 110 determines whether an immediately preceding job is a remote copy job. If the CPU 110 determines in step S804 that an immediately preceding job is not a remote copy job but, for example, a BOX delivery job, the process ends.

If an immediately preceding job is a remote copy job, the process advances to S805. In S805, the CPU 110 of the image receiving apparatus functions as an updated information transmitting unit which transmits, to an image transmitting apparatus, calibration information updated by executing calibration. The CPU 110 of the image receiving apparatus transmits, to the image transmitting apparatus, the updated calibration information, and identification information (apparatus ID) for identifying an image receiving apparatus. In this case, the CPU 110 of the image receiving apparatus can increase the efficiency of a subsequent remote copy job by transmitting, to the image transmitting apparatus, transmission destination information updated by executing calibration.

The calibration information includes the execution time, the end time, information (LUT and image forming pattern) representing the characteristics of the image processing unit, the number of sheets printable till the start of the next calibration, and the contents of an operation executed when the number of printed sheets reaches a calibration start count.

Based on the received calibration information, the image transmitting apparatus updates the contents of the remote copy table. FIG. 11 is a table exemplifying the contents of the remote copy table before update. FIG. 12 is a table exemplifying the contents of the remote copy table after update. In this example, calibration information on the apparatus of the apparatus ID "0813" is updated. The LUT is updated from {01, 23, 25, 73, . . . } to {03, 26, 21, 70, . . . .} Further, the number of sheets printable till the start of calibration is updated from "12" (FIG. 11) to "500" (FIG. 12). By transmitting the latest LUT from the image receiving apparatus to the image transmitting apparatus, half-tone data can be transmitted from the image transmitting apparatus to the image receiving apparatus without exchanging the LUT when performing remote copy.

Figure 17:
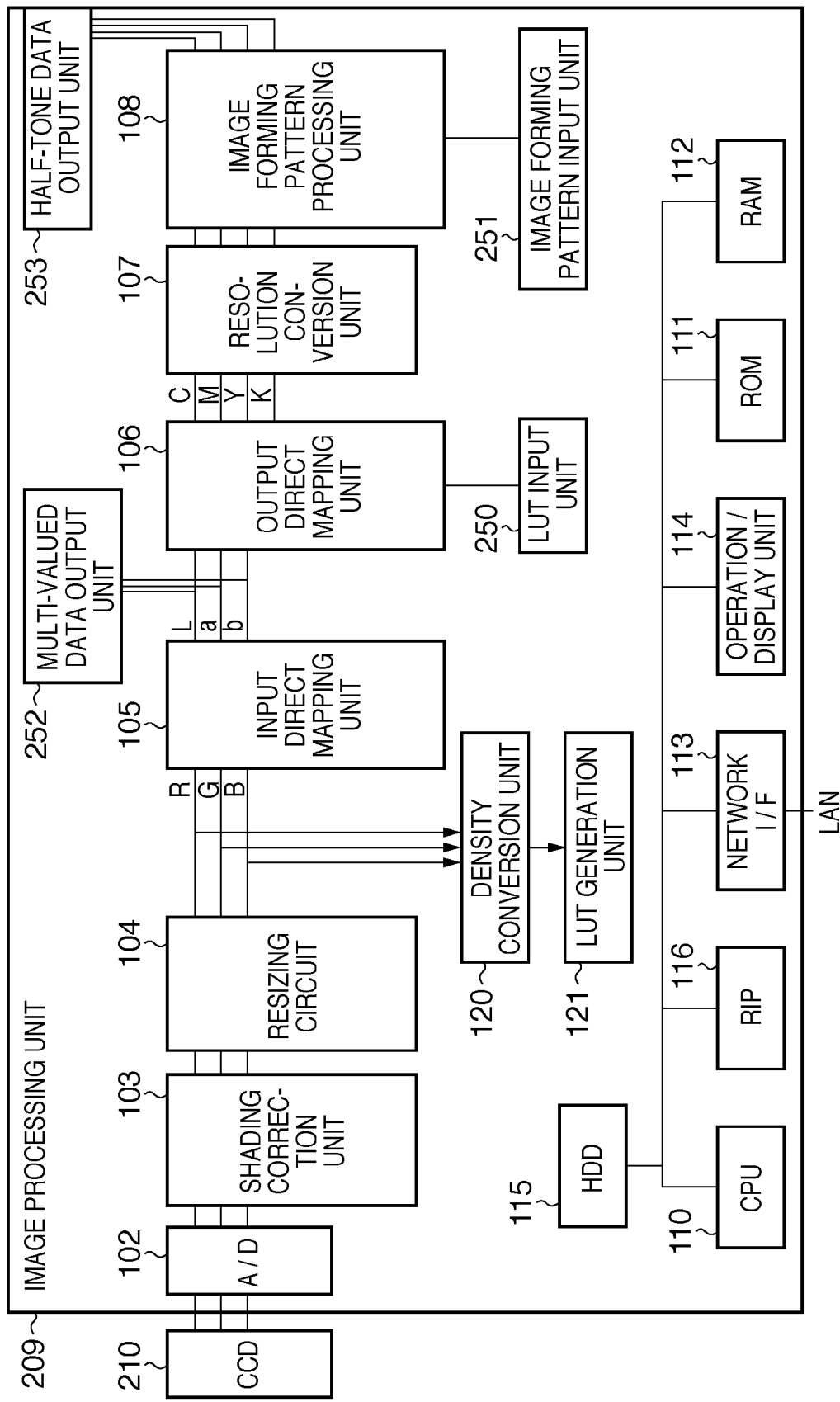
FIG. 17 is a block diagram showing a modification of the image transmitting apparatus.

The image forming system according to the embodiment includes an image transmitting apparatus which generates image data, and an image receiving apparatus which executes print processing based on the image data. In the above description, the image processing units 209 of the image transmitting apparatus and image receiving apparatus have a common arrangement as shown in FIG. 3. However, the purpose of the present invention is not limited to this example. For example, the image transmitting apparatus can also be configured to include units associated with generation of image data and exclude the printer unit 200, as shown in FIG. 17. In the arrangement of FIG. 17, a function for performing print processing for image data is omitted from that of FIG. 3.

Figure 18:
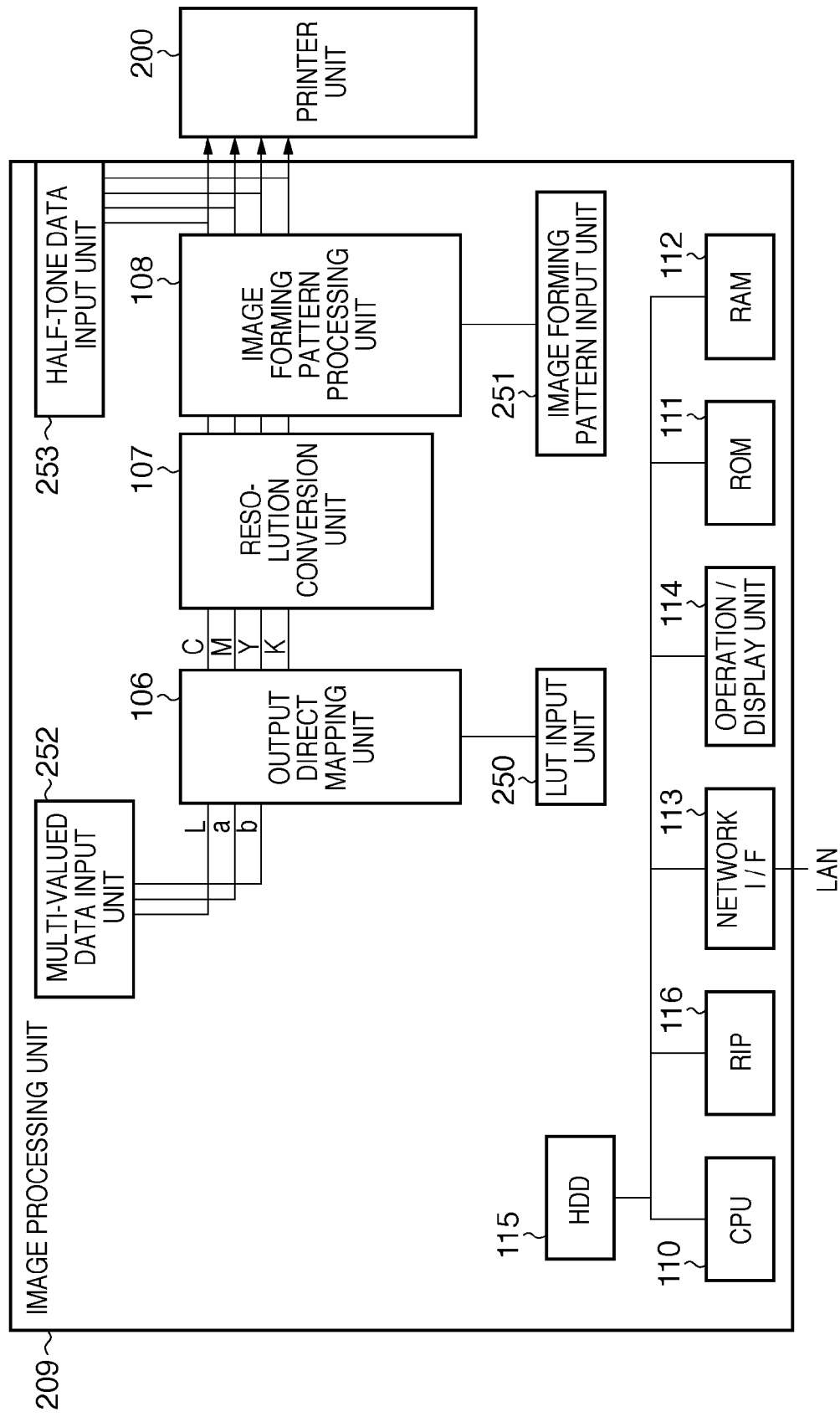
FIG. 18 is a block diagram showing a modification of the image receiving apparatus.

The image receiving apparatus may also be configured to include a multi-valued data input unit 252, a half-tone data input unit 253, the output direct mapping unit 106, the resolution conversion unit 107, the image forming pattern processing unit 108, and the printer unit 200, as shown in FIG. 18. In the arrangement of FIG. 18, a function for generating image data is omitted from that of FIG. 3. The functions of the image transmitting apparatus shown in FIG. 17 and those of the image receiving apparatus shown in FIG. 18 complement each other, implementing the functions of the image forming system.

According to the embodiment, transmission/reception can be switched between multi-valued image data and half-tone image data in accordance with the purpose of use of image data.

Both usability and image data reusability can be achieved by, when half-tone image data is transmitted, transmitting multi-valued image data later, as needed.

In addition, image data can be efficiently transmitted and received by efficiently communicating not only image data but also a half-toning parameter.

Other Embodiments

The object of the present invention is also achieved by supplying a computer-readable storage medium which stores software program codes for implementing the functions of the above-described embodiment to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiment, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiment are implemented when the computer executes the readout program codes. Also, the present invention includes a case where an OS (Operating System) or the like running on the computer performs part or all of actual processing on the basis of the instructions of the program codes and thereby implements the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-060078, filed Mar. 10, 2008, which is hereby incorporated by reference herein in its entirety.

What is claimed is:

1. An image transmitting apparatus that transmits image data to an image receiving apparatus, said image transmitting apparatus comprising:
an input unit adapted to input a designation of an image receiving apparatus serving as a transmission destination of the image data, and a designation of processing to be executed in the image receiving apparatus;
a first transmission unit adapted to convert the image data into half-tone image data, and transmit the half-tone image data to the image receiving apparatus, when a designation of a remote copy for transmitting the image data to the image receiving apparatus and a designation for storing the image data in a storage unit of the image receiving apparatus are input by said input unit; and
a second transmission unit adapted to transmit the image data before a conversion from the image data to the half-tone image data, after transmitting the half-tone image data by said first transmission unit.

2. The image transmission apparatus according to claim 1, further comprising:
an acquisition unit adapted to acquire transmission destination information representing an operating state of said image receiving apparatus by communication with said image receiving apparatus, and
a print processing determination unit adapted to determine, based on the transmission destination information, whether said image receiving apparatus can execute print processing.

3. The image transmission apparatus according to claim 2, wherein the transmission destination information includes information representing whether said image receiving apparatus is in an error state, and information on execution of calibration of an image processing unit in said image receiving apparatus.

4. The image transmission apparatus system according to claim 3, further comprising:
a comparison unit adapted to compare information on execution of calibration of the image processing unit that is acquired by said acquisition unit, and information on execution of calibration of the image processing unit that is stored in advance in the storage unit, and,
when the information on execution of calibration that is acquired by said acquisition unit, and the information on execution of calibration that is stored in advance in the storage unit are different as a result of a comparison by said comparison unit, said acquisition unit further acquires information representing a characteristic of the image processing unit from said image receiving apparatus.

5. The image transmission apparatus according to claim 4, wherein, when said print processing determination unit determines that said image receiving apparatus cannot execute print processing, said second transmission unit transmits multi-valued image data to said image receiving apparatus.

6. The image transmission apparatus according to claim 5, wherein the information on calibration includes a number of sheets printable until a start of a next calibration, and an operation content representing whether to interrupt or continue print processing when a number of printed sheets reaches a calibration start count.

7. The image transmission apparatus according to claim 6, further comprising:
an interrupt determination unit adapted to determine, based on the information on calibration, whether to interrupt print processing in response to a start of calibration during print processing of half-tone image data, and,
when said interrupt determination unit determines to interrupt the print processing, said second transmission unit transmits the multi-valued image data to said image receiving apparatus.

8. An image data processing method in an image transmitting apparatus that transmits image data to an image receiving apparatus, said method comprising:
an input step of inputting a designation of an image receiving apparatus serving as a transmission destination of the image data, and a designation of a processing to be executed in the image receiving apparatus;
a first transmission step of converting the image data into half-tone image data, and transmitting the half-tone image data to the image receiving apparatus, when a designation of a remote copy for transmitting the image data to the image receiving apparatus and a designation for storing the image data in a storage unit of the image receiving apparatus are input in the input step; and
a second transmission step of transmitting the image data before a conversion from the image data to the half-tone image data, after transmitting the half-tone image data in the first transmission step.

9. A non-transitory computer-readable storage medium storing computer-executable code that, when executed by a computer, causes the computer to perform the image data processing method defined in claim 8.

10. An image transmitting apparatus which transmits image data to an image receiving apparatus, the image transmitting apparatus comprising:
a half-tone image data transmitting unit adapted to transmit half-tone image data as the image data to the image receiving apparatus; and
a multi-valued image data transmitting unit adapted to transmit multi-valued image data corresponding to the half-tone image data to the image receiving apparatus after transmitting the half-tone image data.

11. The apparatus according to claim 10, wherein when printing of the image data is designated and reuse of the image data is designated, said multi-valued image data transmitting unit transmits the multi-valued image data to the image receiving apparatus.

12. The apparatus according to claim 10, wherein when an image processing unit of the image receiving apparatus executes calibration, said multi-valued image data transmitting unit executes processing to transmit the multi-valued image data to the image receiving apparatus.

* * * * *